US006630671B2

(12) United States Patent
Lehman et al.

(10) Patent No.: US 6,630,671 B2
(45) Date of Patent: Oct. 7, 2003

(54) DOMAIN ENGINEERED FERROELECTRIC OPTICAL RADIATION DETECTOR HAVING MULTIPLE DOMAIN REGIONS FOR ACOUSTIC DAMPENING

(75) Inventors: John Henry Lehman, Boulder, CO (US); John Andrew Aust, Boulder, CO (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 09/849,959

(22) Filed: May 4, 2001

(65) Prior Publication Data

US 2002/0017607 A1 Feb. 14, 2002

Related U.S. Application Data

(63) Continuation of application No. 09/655,154, filed on Sep. 5, 2000, which is a continuation-in-part of application No. 09/016,561, filed on Jan. 30, 1998, now Pat. No. 6,114,698
(60) Provisional application No. 60/036,409, filed on Jan. 31, 1997.

(51) Int. Cl.[7] .................................................. G01J 5/00
(52) U.S. Cl. ....................................................... 250/338.3
(58) Field of Search ....................................... 250/338.3

(56) References Cited

U.S. PATENT DOCUMENTS

| | | | |
|---|---|---|---|
| 3,453,432 A | 7/1969 | McHenry | 250/83.3 |
| 4,110,616 A | 8/1978 | Porter et al. | 250/338 |
| 4,224,521 A | 9/1980 | Fisher | 250/340 |
| 4,441,023 A | 4/1984 | Doctor et al. | 250/338 |
| 4,532,424 A | 7/1985 | Cheung | 250/338 |
| 4,542,294 A | 9/1985 | Tamura et al. | 250/338 |
| 4,598,163 A | 7/1986 | Ito | 136/213 |
| 4,629,319 A | 12/1986 | Clarke et al. | 356/237 |
| 4,792,682 A | 12/1988 | Endou et al. | 250/338.3 |
| 4,920,385 A | 4/1990 | Clarke et al. | 356/237 |
| 4,943,800 A | 7/1990 | Ikeda et al. | 340/567 |
| 4,963,741 A | 10/1990 | McMullin | 250/338.3 |
| 4,967,082 A | 10/1990 | Cooke et al. | 250/338.3 |
| 5,652,674 A * | 7/1997 | Mizuuchi et al. | 359/326 |
| 5,875,053 A * | 2/1999 | Webjorn et al. | 359/326 |

OTHER PUBLICATIONS

R.S. Weis and T.K. Gaylord, Lithium Niobate: Summary of Physical Properties and Crystal Structures, Applied Physics A37, 191–203, 192, 1985.

(List continued on next page.)

*Primary Examiner*—Constantine Hannaher
(74) *Attorney, Agent, or Firm*—William W. Cochran II

(57) ABSTRACT

A pyroelectric detector with significantly reduced microphonic noise sensitivity that includes a pyroelectric detector element constructed from a z-cut $LiNbO_3$ or $LiTaO_3$ electret. Selective domain reversal is accomplished in the electret by applying an electric field. Electrodes are attached to either surface of the electret spanning the domain reversed region and a portion of the original domain region to create areas of equal and opposite sensitivity. The detector is mounted in an electrically grounded container or housing. The detector may also be constructed having multiple detector regions to accommodate resonant acoustic frequencies of the electret, to function as a position sensor, or both. In other words, the position sensor has multiple domain regions that also accommodate acoustic frequencies. The detector may also be constructed having domain reversed regions placed on the electret in a periodic pattern having a geometry and spacing that is related to the acoustic impulse response of the electret. Needle domains may also be interspersed in portions or throughout the electret to scatter acoustic waves and thereby reduce acoustic noise. Multiple detectors can be produced in a simple and inexpensive manner using shadow masking techniques.

25 Claims, 22 Drawing Sheets

OTHER PUBLICATIONS

C.B. Roundy, R.L. Byer, Subnanosecond Pyroelectric Detector, Applied Physics Letters, vol. 21, No. 10, 1972, pp. 512–515.

L.E. Meyers, R.C. Bokardt, M.M. Rejer, R.L. Byer, W.R. Bosenberg, J.W. Perce, Quasi–phase–matched Optical Parametric Oscillators in Bulk Periodically Poled NbO3, Journal of the Optical Society of America B, vol. 12, No. 11, pp. 2102–2116, 1995.

M. Houe, P.D. Townsend, An Introduction to Methods of Periodic Poling for Second–Harmonic Generation, Journal of Physics D, Applied Physics 28, pp. 1747–1763, 1995.

A.J. DeVries, P. Everett, D.F. Gilchrist, K. Hansen, T.J. Wojcik, Acoustic Effects of Filamentary Defects in Y–Z LiNbO3, 1979 Ultrasonics Symposium, IEEE, 1979, pp. 584–588.

* cited by examiner

DOMAIN ENGINEERED FERROELECTRIC OPTICAL RADIATION DETECTOR HAVING MULTIPLE DOMAIN REGIONS FOR ACOUSTIC DAMPENING

REFERENCE TO RELATED APPLICATIONS

This application claims the benefit of U.S. provisional application Ser. No. 60/036,409 filed Jan. 31, 1997, and is a continuation-in-part of U.S. patent application Ser. No. 09/016,561 filed Jan. 30, 1998, now U.S. Pat. No. 6,114,698, and U.S. patent application Ser. No. 09/655,154 filed Sep. 5, 2000.

BACKGROUND OF THE INVENTION a. Field of the Invention

The present invention pertains generally to pyroelectric optical radiation detection, and more particularly to pyroelectric detectors constructed from a single electret in which the spontaneous polarization is selectively reversed to optimize acoustic nulling and/or modify spatial responsivity to enable position sensing.

b. Description of the Background

In the past, attempts have been made to reduce the unwanted microphonic signal in pyroelectric detectors by mechanical design, electrical design, or both. One such mechanical design places the electret on a platform optimized for dampening microphonic resonances. A platform, however, is not optimum because the low-frequency response of an electret of nonuniform thickness and/or heat sink conditions will not be spatially uniform. The simplest electrical design uses two identical electrets having opposite polarizations that are connected so that the effects of acoustic noise are cancelled. Multiple electrode schemes have been used on a single electret to reject microphonic signals. Domain engineering techniques have also been used. Domain engineering techniques in materials such as $LiTaO_3$ have required the use of an ion mill. This has resulted in very small, fragile detectors. Domain engineering in polymers such as polyvinyladine flouride has also been used, but such detectors do not have the same pyroelectric coefficient as those made from $LiNbO_3$ and $LiTaO_3$. They also result in detectors that do not have a highly uniform thickness. Acoustic ringing can also result from the deformation of the electret as a result of sound or pressure waves, the impingement of a pulsed laser, and other sources of noise. High frequency pulsed lasers may also create acoustic waves that cause the thickness of the electret to vary, creating additional acoustic resonances. The acoustic ringing and resonances may take the form of standing or traveling waves in the electret.

It would therefore be advantageous to provide a single pyroelectric detector that provides acoustic nulling, beam detection and dampening of acoustic ringing and acoustic resonances.

SUMMARY OF THE INVENTION

The present invention overcomes the disadvantages and limitations of the prior art by providing a single pyroelectric detector that is capable of providing acoustic nulling, beam location detection and dampening of acoustic ringing and acoustic resonances. This is accomplished by using a single crystal that has reversed domain polarization regions. Acoustic nulling is provided by combining the outputs of the reversed domain polarization regions. Optical beam detection and location of the optical beam on the electret can then be realized as a result of the pyroelectric effects of the electret as opposed to the piezoelectric effects of acoustic noise. The reversed domain regions can be placed in a periodic pattern that is related to the speed at which the acoustic noise travels through the electret to allow nulling of standing or traveling waves. Additionally, acoustic noise is physically dissipated and scattered by the introduction of multiple domain regions that further reduces acoustic ringing. For example, the introduction of needle domains functions to scatter and dissipate acoustic waves in the electret.

The present invention may therefore comprise a method of reducing acoustic noise in a pyroelectric detector formed from a z-cut single crystal electret comprising: generating a plurality of domain regions in the electret having opposite polarization directions, the domain regions having a periodic pattern that substantially corresponds to wave patterns of acoustic noise; providing an electrode that covers approximately equal portions of the plurality of domain regions, so that charges generated by the plurality of domain regions in response to acoustic noise can be combined to substantially null the acoustic noise.

The present invention may further comprise the method of constructing a pyroelectric detector from a z-cut single crystal electret comprising: generating a first domain region in the electret having a first polarization; generating a plurality of needle domain regions having a polarization which is opposite to the first predetermined polarization.

The present invention may further comprise the method of constructing a multicell pyroelectric detector formed from a z-cut single crystal electret for detecting the position of a light beam comprising: generating at least two domain regions in a central portion of the electret having opposite polarizations; generating a plurality of needle domain regions surrounding the central portion of the electret.

The present invention may further comprise the method of forming a plurality of bicell pyroelectric detectors using a shadow mask comprising: providing a z-cut single crystal electret having a spontaneous polarization in a first direction; placing a shadow mask on the electret that has openings that correspond to the regions in which a polarization is desired that is opposite to the spontaneous polarization of the electret; depositing a poling electrode on the electret in the areas of the openings of the shadow mask; using the poling electrodes to polarize the electret with the opposite polarization; removing the poling electrodes; dividing up the electret to form the plurality of multicell pyroelectric detectors.

The present invention may further comprise a multicell pyroelectric detector formed by the method of: providing a z-cut single crystal electret having a spontaneous polarization in a first direction; placing a shadow mask on the electret that has openings that correspond to the regions in which a polarization is desired that is opposite to the spontaneous polarization of the electret; depositing a poling electrode on the electret in the areas of the openings of the shadow mask; using the poling electrodes to polarize the electret with the opposite polarization; removing the poling electrodes; dividing up the electret to form the plurality of multicell pyroelectric detectors.

The present invention may further comprise a pyroelectric detector formed from a z-cut single crystal electret comprising: a central portion of the electret; a plurality of domain regions surrounding the central portion the plurality of domain regions having opposite polarization directions, the plurality of domain regions having a periodic pattern that substantially corresponds to wave patterns of acoustic noise generated in the electret; an electrode that covers approximately equal portions of the plurality of domain regions so that charges generated by the plurality of domain regions in response to acoustic noise are combined to substantially null the acoustic noise.

The present invention may further comprise a pyroelectric detector that reduces acoustic noise comprising: a z-cut single crystal electret having a polarization in a first direction; at least one detector region disposed on the electret; a plurality of needle domain regions having a polarization that is opposite to the first direction, the needle domain regions dispersed on the electret around at least one detector region of the electret.

The advantages of the present invention are that acoustic noise can be nulled by combining the outputs of the oppositely poled regions of the electret in a single crystal. The use of the single crystal provides for better nulling for a number of reasons. For example, temperature variations between separate crystals do not occur using a single crystal. Additionally, the domain region interfaces function to dissipate and scatter the wavefronts of acoustic noise and reduces the acoustic ringing and resonances that may occur in the crystal. The present invention also uses a plurality of alternating oppositely polarized domain regions that are disposed in a geometrical pattern having a size that allows for nulling of at least the first order structural resonances in the crystal. The oppositely polarized domain regions are sized to be an integer value, e.g. a fractional integer value or a multiple integer value of the wavelength of the propagation speed of the acoustic signal through the electret, so that cancellation can be employed using the oppositely polarized regions.

Further, the present invention can be utilized to reduce acoustic noise that is generated by radiation pressure from pulsed lasers that are detected by the electret. Pulsed lasers can create a periodic ringing in the electret that is related to the frequency of the pulses of the pulsed laser, the propagation speed of acoustic waves in the electret, the size and aspect ratios of the electret and other factors. Interference patterns in the form of standing and traveling acoustic waves created by the pulsed laser are physically dispersed by the domain interfaces from both geometrically placed domain regions and needle domains. In addition to the physical scattering of the acoustic wave by the domain interfaces, the domain regions can be placed on the electret at some integer fraction or multiple of the wavelength of the standing or traveling acoustic wave produced by the pulsed laser, in the same fashion as indicated above, to provide for cancellation of these standing waves. In this fashion, if the pulsed frequency of the laser is known, as well as the speed of propagation of the acoustic signal within the crystalline electret material, domain regions can be designed to reduce the effects of these types of acoustic resonances.

DETAILED DESCRIPTION OF THE PREFERRED EMBODIMENT

Figure 1:
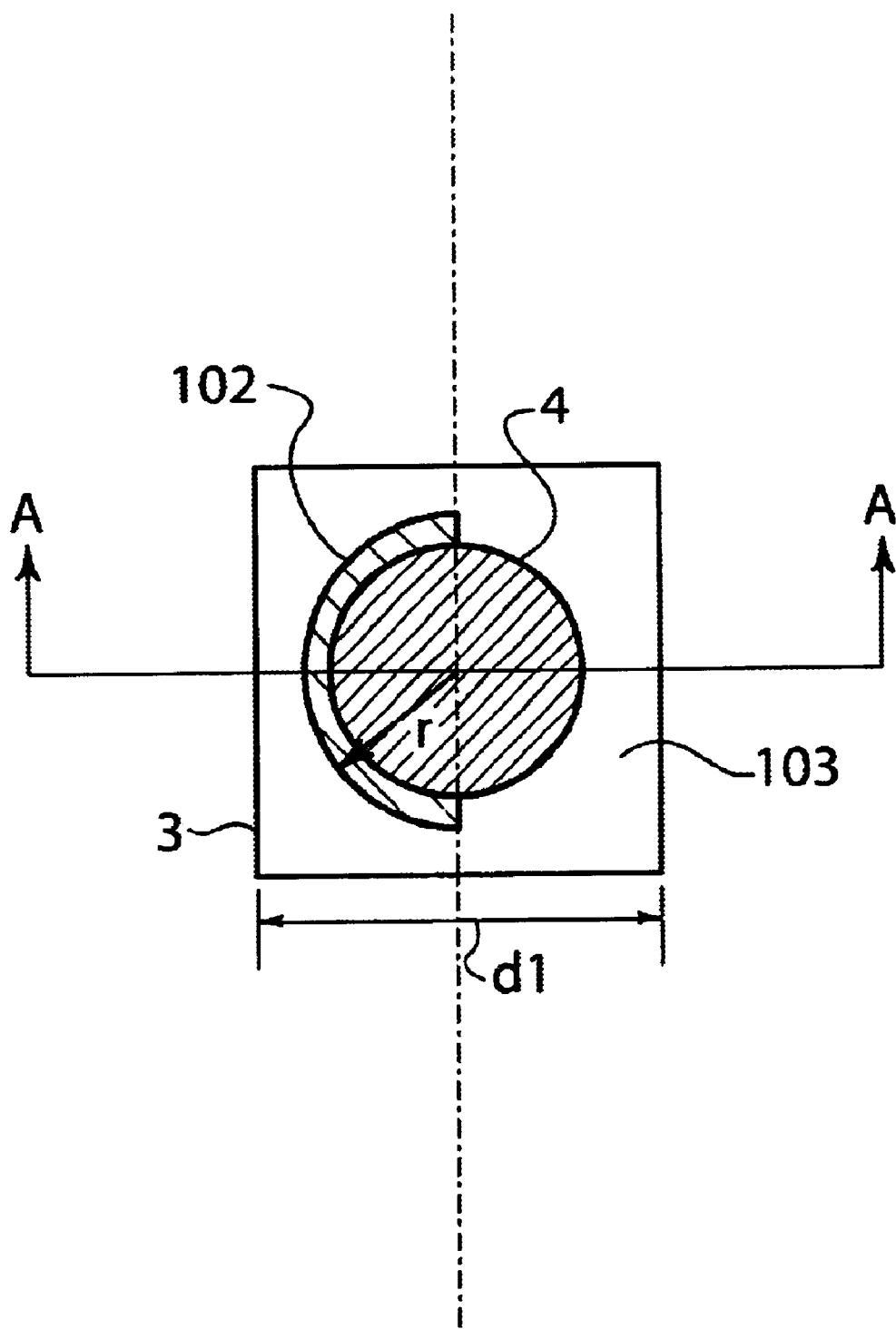
FIG. 1 is a plan view of the electret.

FIG. 1 is a plan view of the electret 3. Domain reversed region 102 is impressed by electric field poling, described below. In general, the direction of the spontaneous polarization present in a z-cut $LiNbO_3$ or $LiTaO_3$ electret is selectively reversed using electric field poling at room temperature, so that areas of equal and opposite sensitivity are created to produce a bicell pyroelectric detector. "In the paraelectric phase above the Curie temperature, the Li atoms lie in an oxygen layer that is c/4 away from the Nb atom, and the Nb atoms are centered between oxygen layers. These positions make the paraelectric phase non-polar. As the temperature decreases from the Curie temperature, the elastic forces of the crystal become dominant and force the lithium and niobium ions into new positions. The charge separation resulting from this shift of ions relative to the oxygen octahedra causes $LiNbO_3$ to exhibit spontaneous polarization at temperatures below 1210° C." R. S. Weis and T. K. Gaylord, *Lithium Niobate: Summary of Physical Properties and Crystal Structures*, Applied Physics A37, 191–203, 192, 1985. The same is true for $LiTaO_3$ at temperatures below 610° C.

The detector requires only a single set of electrodes: one electrode on the front surface and one on the back surface. Microphonic noise that is typical of monocell pyroelectric detectors is reduced in the present invention. The optical response of one half of the bicell detector area is equal and opposite to the other half within 1.2%. The microphonic suppression of the bicell pyroelectric detector compared to a reference monocell pyroelectric detector has been measured to be less than −36 dB from 10 Hz to 50 Hz and −118 dB at 35 Hz.

The pyroelectric detector element was constructed from a z-cut $LiNbO_3$ or $LiTaO_3$ electret, measuring 15.5 mm square and 200 $\mu$m thick in accordance with experiments run by the inventors. As set forth herein, the electret can have various sizes and thickness to provide desired results. Photolithography, shadow masks, or other well known techniques can be used in the construction of the detector. Photolithography uses a method of patterning desired features on a substrate. The method employs a light sensitive material called photoresist (PR). The PR is applied to the surface of the substrates in a known manner, where it is baked. The desired pattern is then transferred to the PR by exposing it to an UV light through a mask of the desired pattern. After it is exposed, it is developed. Depending upon the method chosen, both of which are well known, the exposed PR is either removed or left in place.

In the experimental tests, domain reversal was accomplished by applying an electric field of 24.5 kV/mm across the electret. The electric field may vary with the physical attributes of the electret. The region that was domain reversed was confined to the photolithographically patterned open area in the photoresist. The resulting domain reversed area was a semi-circle of approximately 6 mm radius, as shown in FIG. 1. To create the pyroelectric detector element, circular nickel electrodes 9.5 mm in diameter and 25 mm thick were deposited on either side of the electret as also shown in FIG. 1. The detector element was mounted in a container using electrically conducting epoxy.

Figure 7:
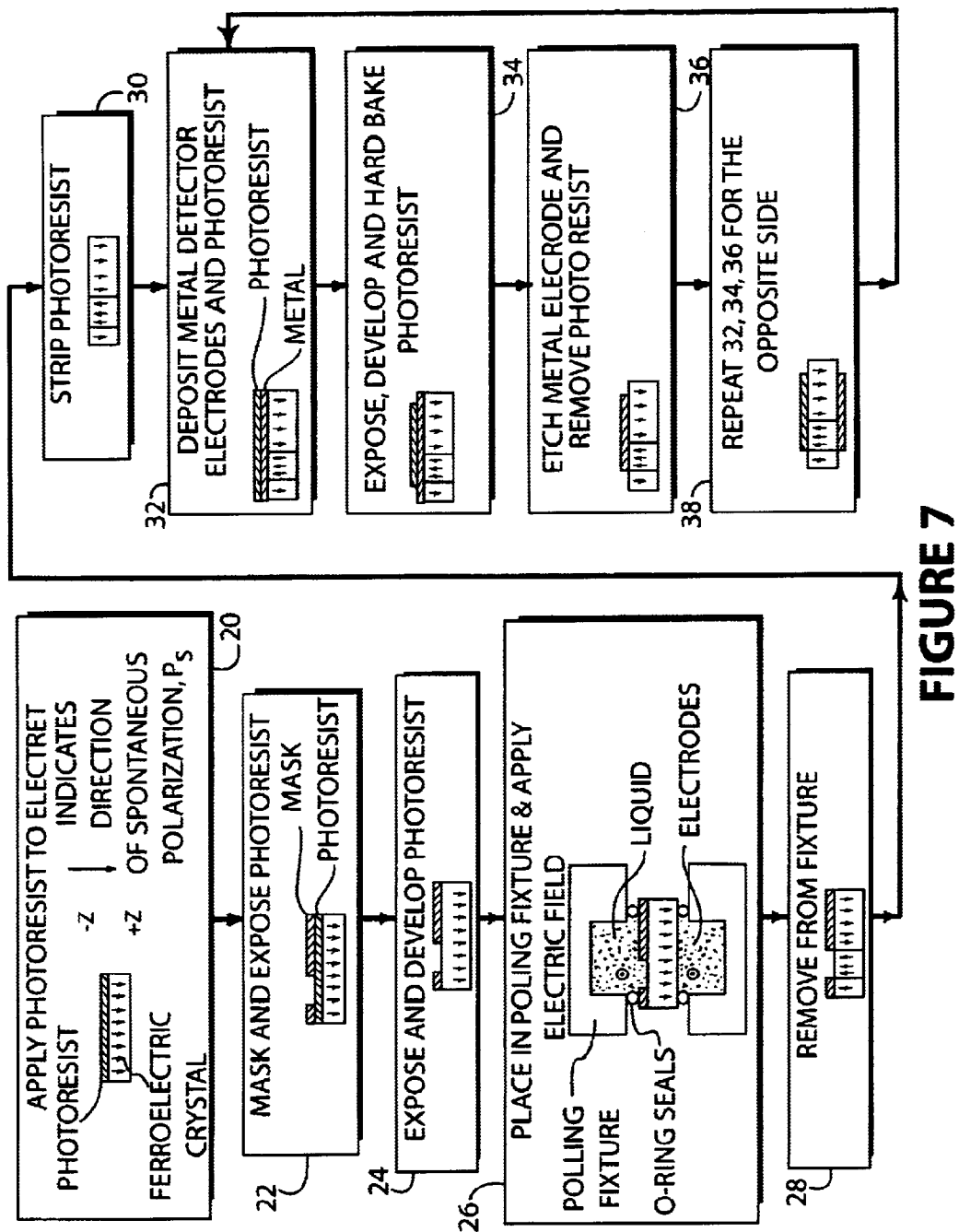
FIG. 7 is a flowchart of the steps that can be used to prepare the detector electret.

Referring again to FIG. 1, the electrode 4 is shown attached to the electret 3 over the domain reversed region 102 and a portion of the original domain region 103. The pyroelectric detector element was constructed in the experimental tests from a z-cut $LiNbO_3$ or $LiTaO_3$ electret measuring 15.5 mm square and 200 $\mu$m thick, as indicated above and shown on FIG. 1 and FIG. 2 as d1 and d2, respectively. Using electric field poling at room temperature, the direction of the spontaneous polarization can be selectively reversed in domain reversed region 102 of FIG. 1 to produce the bicell pyroelectric detector. Selective domain reversal to re-orient the spontaneous polarization of approximately one-half of the detector can be accomplished by photolithographically opening one or more desired regions in the photoresist and clamping electret 3 in an acrylic fixture that allows independent electrical contact of the faces by means of liquid electrodes, as shown in FIG. 7, box 26 [L. E. Meyers, R. C. Eckardt, M. M. Fejer, R. L. Byer, W. R. Bosenberg, J. W. Pierce, *Quasi-phase-matched Optical Parametric Oscillators in Bulk Periodically Poled LiNbO3*, J. Opt. Soc. Am. B, Vol. 12, No. 11, pp. 2102–2116, 1995] or other techniques known in the art. See M. Houe', P. D. Townsend, "An Introduction to Methods of Periodic Poling for Second-harmonic Generation," J. Phys. D: Appl. Phys. 28 (1995) 1747–1763. O-rings can be used to confine the liquid electrodes in the poling fixture. As indicated above, a 24.5 kV/mm electric field was then applied across the electrodes in the experimental tests such that the field was orientated with the more positive pole on the positive z-face of the electret and the more negative pole on the negative z-face of the electret. In general, the applied electric field may be in the range of 21 kV/mm to 30 kV/mm. The resulting domain-reversed area produced in the experiment was a semi-circle of approximately 6 mm radius shown as "r" on FIG. 1. The detector region that corresponds to the area of the circular metal electrodes 2,4 may have a width in the range of 4 $\mu$m to 100 mm. Circular metal electrodes 2 and 4, typically nickel, are then deposited on either side of the electret 3 as described in FIG. 7 using methods known in the art. The electrodes have a thickness in the range of 1 $\mu$m to 100 82 m and a diameter in the range of 4 $\mu$m to 100 mm. In the preferred embodiment, the electrodes are typically 9.5 mm in diameter and 25 nm thick. For the preferred embodiment, the detector requires only a single set of electrodes.

Figure 2:
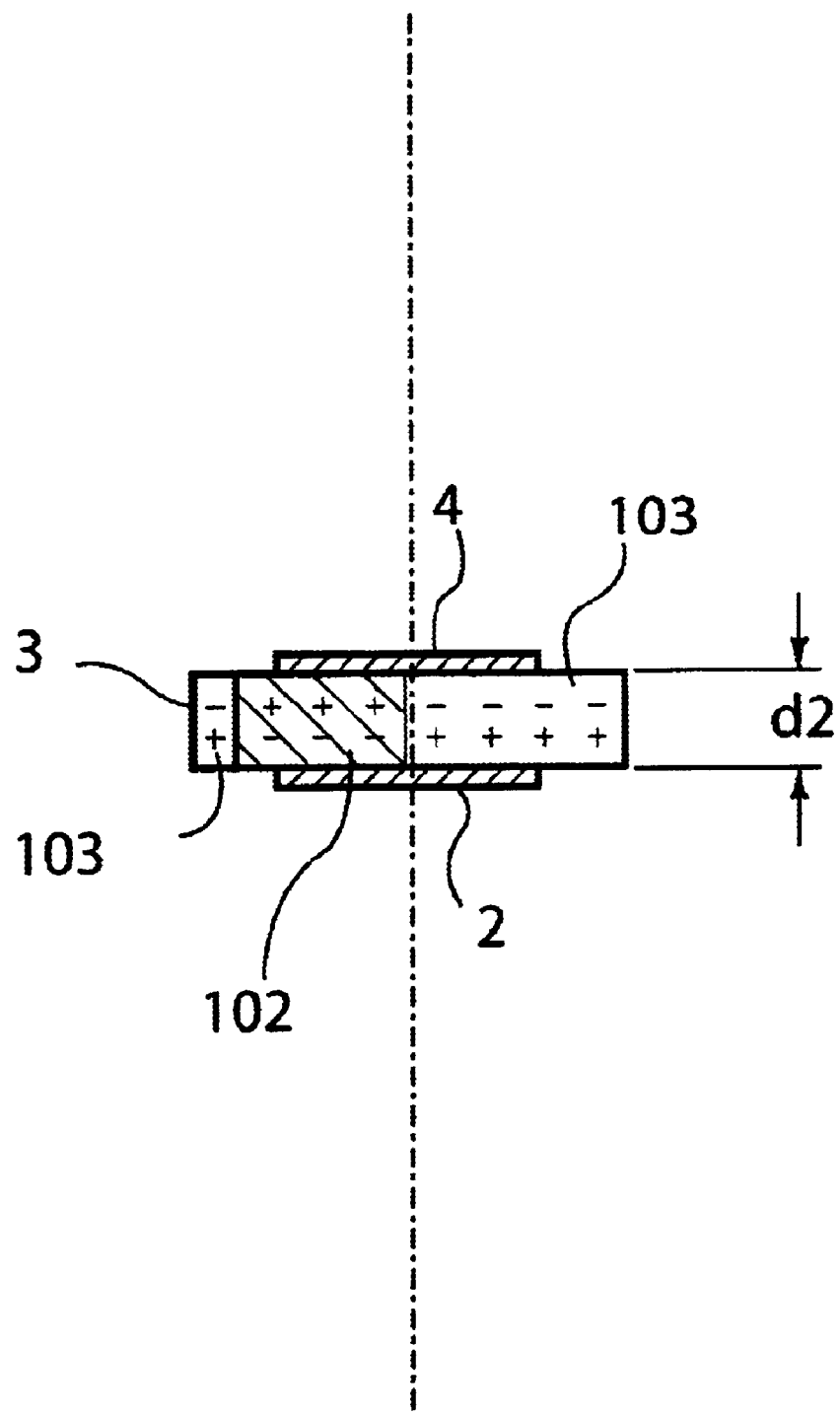
FIG. 2 is a cross-sectional view along line A—A of FIG. 1.

FIG. 2 is a cross-sectional view along line A—A in FIG. 1. Electrodes 2 and 4 are attached to opposite sides of the electret 3. They are preferably made of metal, such as nickel, or conductive oxide. The electret 3 has a thickness (d2) in the range of 10 $\mu$m to 1 mm. The present invention can be used with thinner electrets as they are commercially available. Original domain region 103 has a direction of spontaneous polarization in the electret 3 as shown. Once the electric field is applied to the electret 3 as described in FIG. 7, a domain reversed region 102 is created which has a spontaneous polarization direction that is opposite to that of the original domain region 103.

Figure 3:
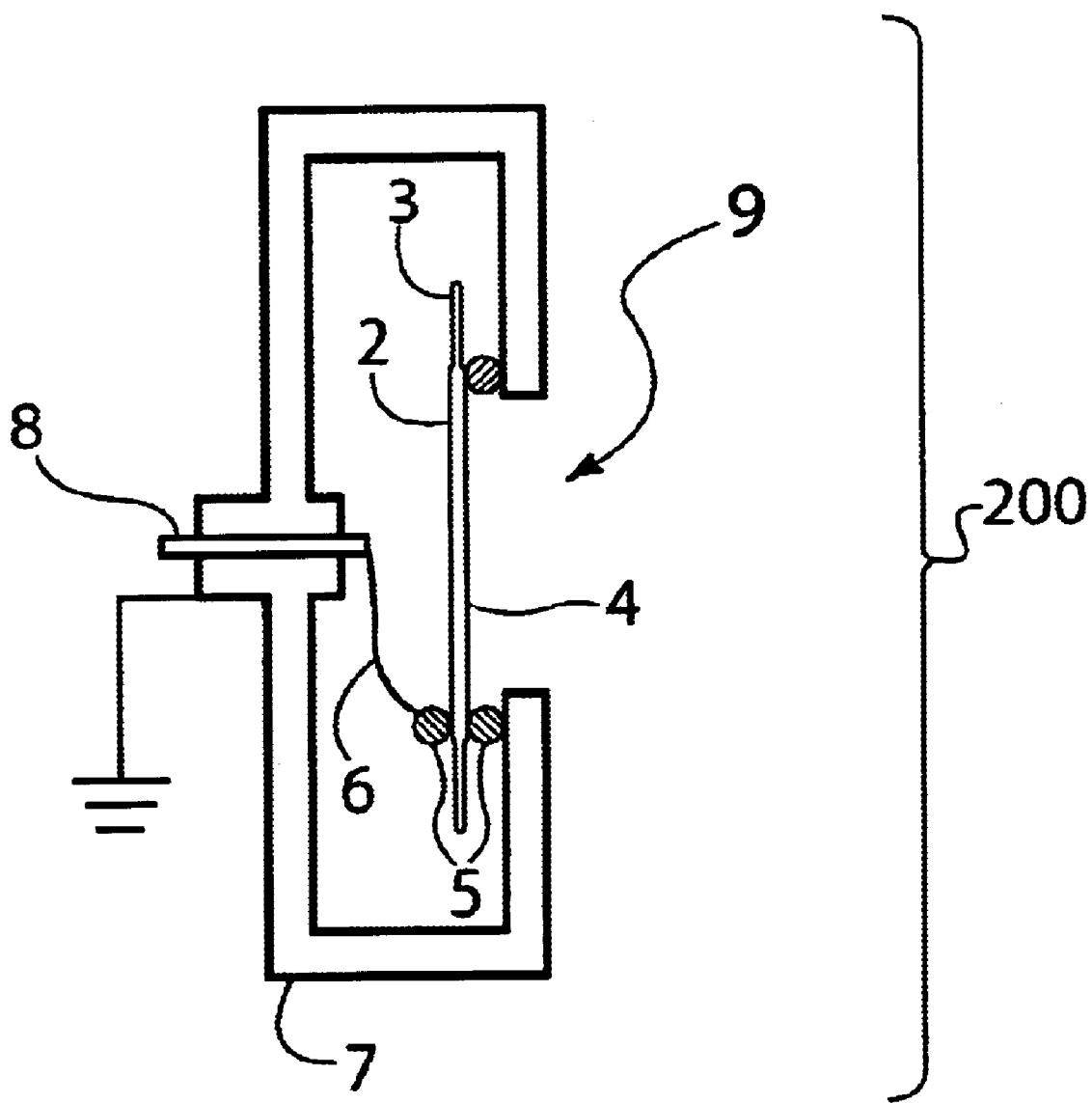
FIG. 3 is a cross-sectional view of a pyroelectric detector assembly.

FIG. 3 is a cross-sectional view of a pyroelectric detector assembly 200. The detector element is attached electrically and mechanically to the container 7. For example, electrically conducting epoxy 5 may be used on the perimeter of the container opening 9. As a result, the area defined by electrode 2 is not attached to a rigid heat sink and, therefore, provides a more spatially uniform response to an optical input. Container 7 is grounded, which provides electromagnetic shielding for the signal wire 6. The detector signal output is obtained at signal feedthrough 8.

Figure 4:
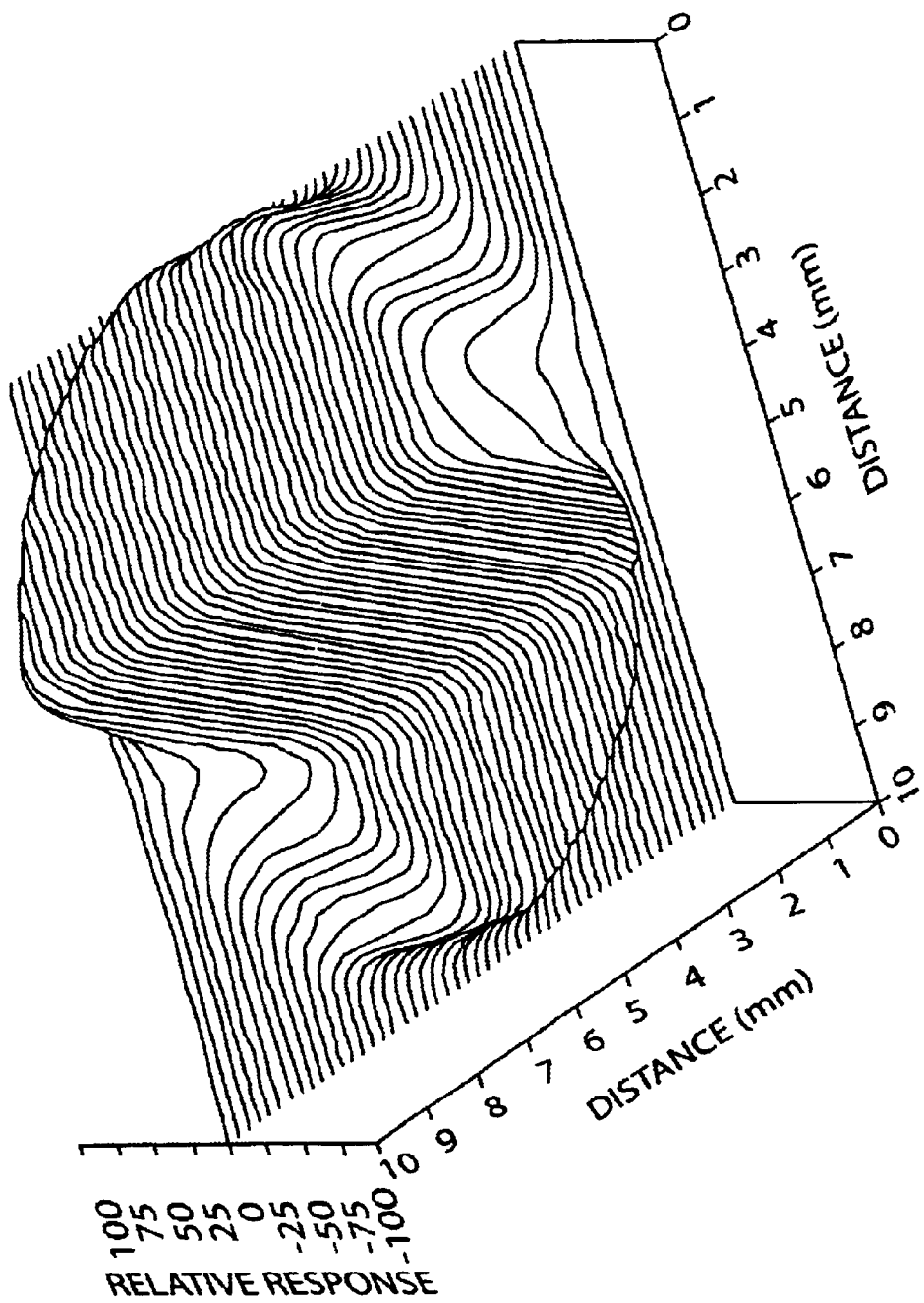
FIG. 4 is a perspective view of a graph of the spatial responsivity of the electret.

FIG. 4 is a perspective view of a map of the responsivity of the detector showing the opposing response of the domain reversed region compared to the original domain region on the electret. The map of FIG. 4 clearly shows the opposite responses of the oppositely polarized regions of the electret.

Figure 5:
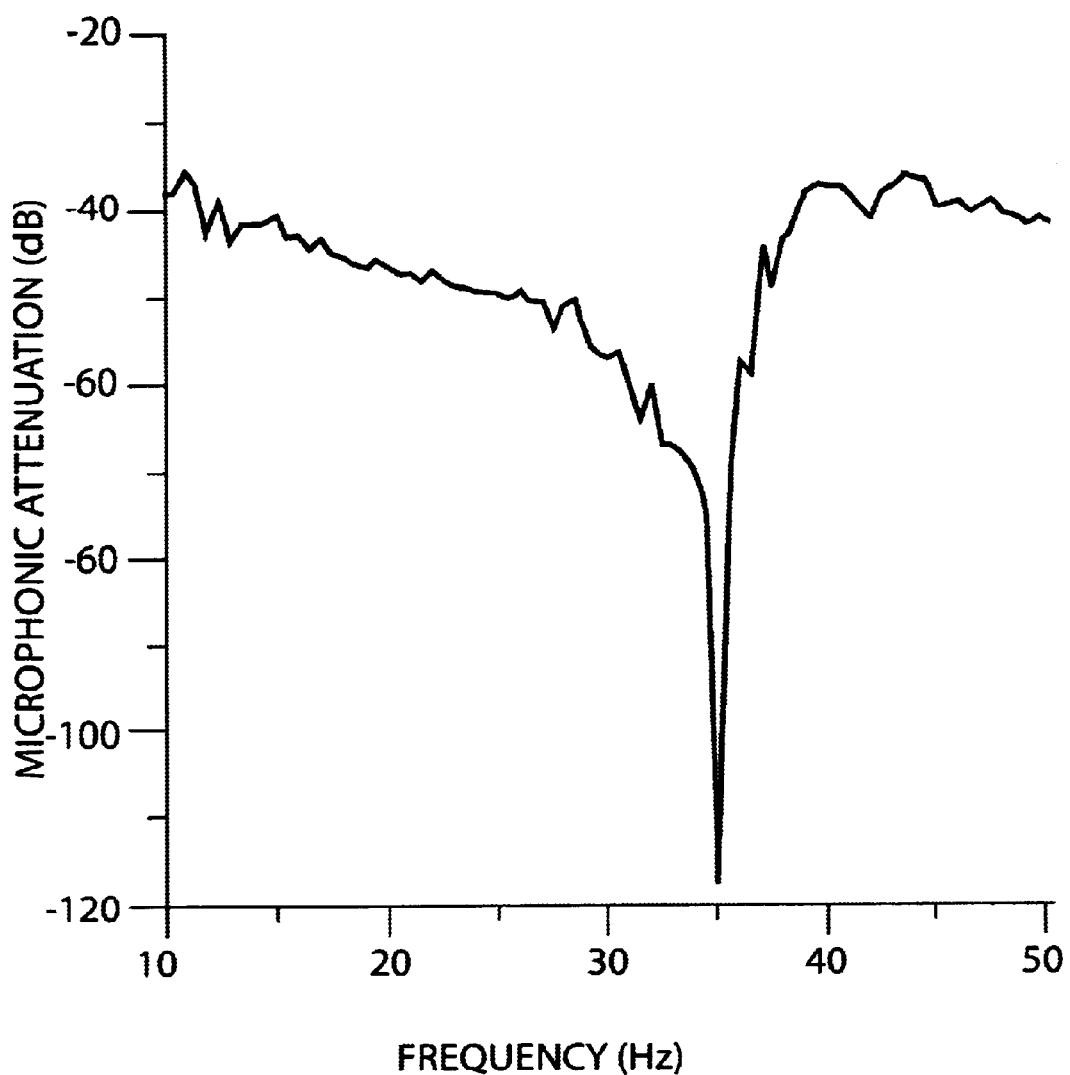
FIG. 5 is a graph of the microphonic frequency response in the detector.

FIG. 5 shows a graph of the microphonic frequency attenuation of the detector. The detector current response is obtained by modulating the acoustic or optical input and measuring the electrical output with a current mode preamplifier and a lock-in amplifier. The pyroelectric current $I_{pyro}$ may be expressed by:

$$I_{pyro}=(j\omega p/b)\exp(j\omega t)\int T(x)dx \tag{1}$$

Equation (1) is given to point out that the pyroelectric current depends on the electret thickness b and the electret temperature T(x) averaged over the electret thickness. The remaining parameters in equation (1) are defined as the pyroelectric coefficient per unit area p, time t, and angular frequency $\omega=2\pi f$, where f is the modulation frequency of the optical input. The piezoelectric current $I_{piezo}$ is given by:

$$I_{piezo}=KfA\sigma \tag{2}$$

As equation (2) indicates, the piezoelectric current response is proportional to the electrode area A, the acoustic frequency f, and the stress $\sigma$ on the electret. The stress $\sigma$ on the electret is the result of sound pressure. The proportionality constant K is a function of the elastic moduli, the geometry and behavior for different vibration modes, and the piezoelectric tensor elements.

The spatial uniformity is measured as follows. The detector was attached to a 2-axis translation stage. The stage was driven by DC servo-motors and controlled using an optical encoder and a computer. The light from a 674 nm laser diode was focused to a spot diameter of approximately 500 μm and was used as a probe. The laser was operated at 0.5 mW and was chopped at 75 Hz. As the probe was scanned across the detector's aperture at 200 μm intervals, the detector signal was sampled and recorded. A surface map of these data is shown in FIG. 4. The data were normalized to the value of the highest response of any location on the detector. The average response of the domain-reversed half of the bicell detector was −95.3%, with a standard deviation of 1.6%. The average of the other half was 94.5% with a standard deviation of 1.5%.

The relative acoustic frequency response was measured using a loudspeaker located 45 mm away and facing the detector aperture. The loudspeaker output was coupled to the pyroelectric detector through the surrounding air. The pyroelectric detector output was sampled and recorded over the frequency range 10 to 50 Hz. Low frequency microphonics are of interest because the minimum noise equivalent power (NEP) is typically well below 100 Hz.

The microphonic response measurement was performed on the bicell pyroelectric detector and on the reference monocell pyroelectric detector. These data are represented by the microphonic signal attenuation:

$$R(f) = 20 \log(i_b(f)/i_s(f)) \tag{3}$$

In equation (3), $i_s(f)$ is the piezoelectric frequency response of the monocell detector and $i_b(f)$ is the piezoelectric frequency response of the biocell detector. The quantities $i_s(f)$ and $i_b(f)$ are both piezoelectric current signals that are each proportional to the pressure acting on the pyroelectric element. The acoustic frequency response is shown in FIG. 5. The uncertainty of the data varies from a few tenths of one percent to nearly 10% at 35 Hz where the bicell's acoustic sensitivity response approaches zero. The bicell pyroelectric optical detector displayed good spatial uniformity, a simple electrode configuration, and excellent microphonic noise suppression. The optical response of either half of the monolithic bicell is equal and opposite to the other within 1.2%. The standard deviation of the response of each half is less than 1.6%. The acoustic frequency response showed −118 dB microphonic suppression at 35 Hz. The low noise at 35 Hz is a function of the package and poling pattern which may be varied to shift the minimum.

Figure 6:
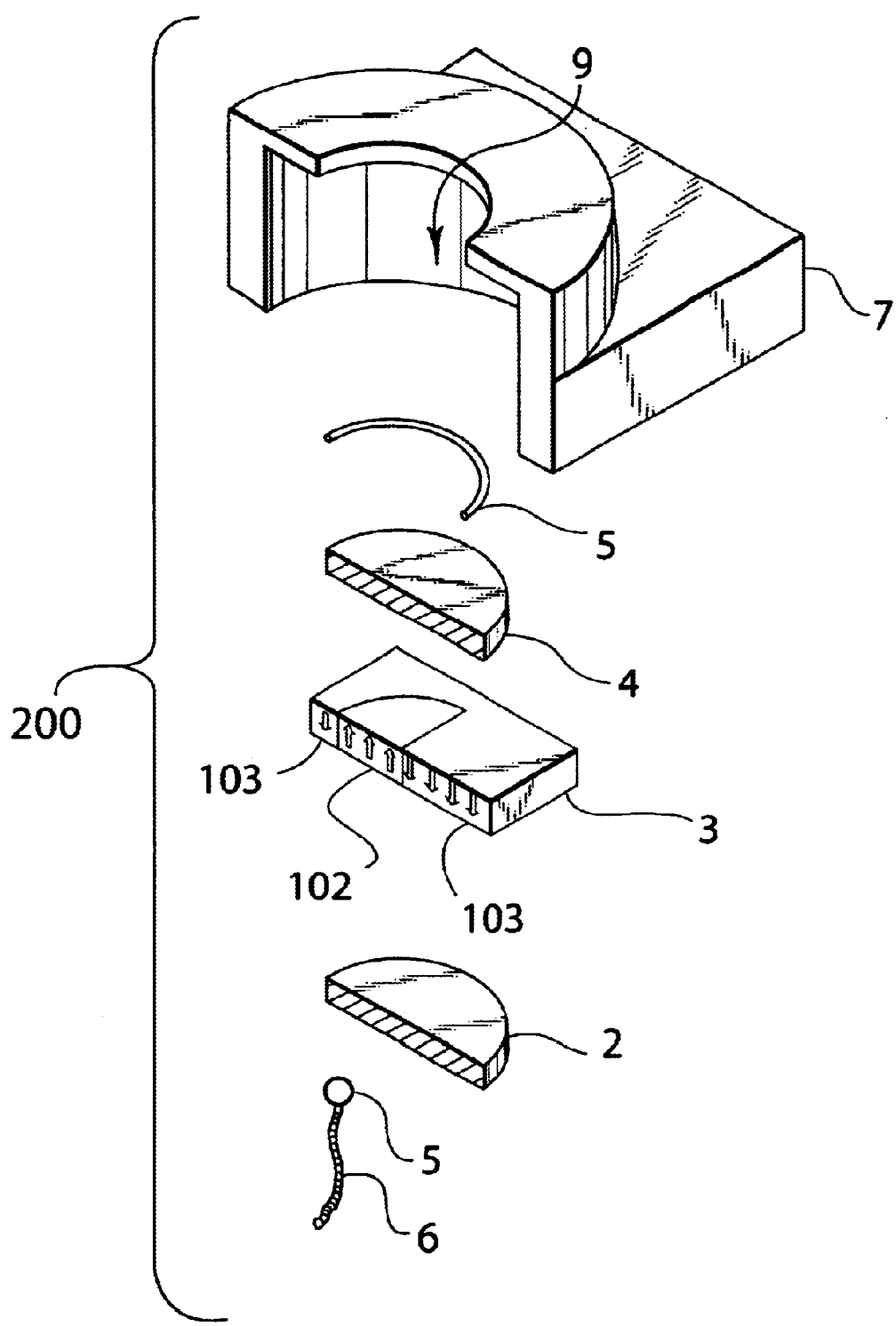
FIG. 6 is an exploded view of the detector assembly shown in FIG. 3.

FIG. 6 is an exploded view of the detector assembly 200. Electrodes 2 and 4 are shown on opposite sides of electret 3. An electrically conducting epoxy 5 may be used to attach electric 3 to container 7. Signal wire 6 is attached to an outer perimeter of electrode 2 and may be attached using electrically conducting epoxy. Electrode 4 is aligned with opening 9. The domain reversed region 102 may have a radius in the range of 2 μm up to 50 mm, the upper range of which is limited by the available electret size. The spontaneous polarization in original domain region 103 is shown adjacent to the reversed spontaneous polarization in domain reversed region 102. The arrows show the direction of polarization with the head of the arrows pointing to the positive charge.

FIG. 7 is a flowchart of the steps to construct the detector electret. The photoresist is applied to the electret at step 20. The photoresist is then masked, exposed to UV light, and developed at steps 22 and 24. The electret is then placed in the poling fixture as described in FIG. 1, and the electric field is then applied to the electret at step 26. The applied electric field may be in the range of 21 kV/mm to 30 kV/mm at room temperature as indicated above. The application of the electric field results in the creation of the domain reversed regions described herein. The electret is then removed from the fixture at step 28. The photoresist is then stripped from the electret at step 30. The electrode material is then deposited on the electret at step 32. A layer of photoresist is then applied on top of the metal layer. The photoresist is then developed and hard-baked at step 34. The exposed metal is then etched, and the photoresist is removed revealing the electrode at step 36. Steps 30, 32, 34 and 36 are then repeated to apply an electrode to the side opposite from that applied above at step 38. This method may be used to construct detector electrets having multiple domain reversed detector regions.

Figure 8A:
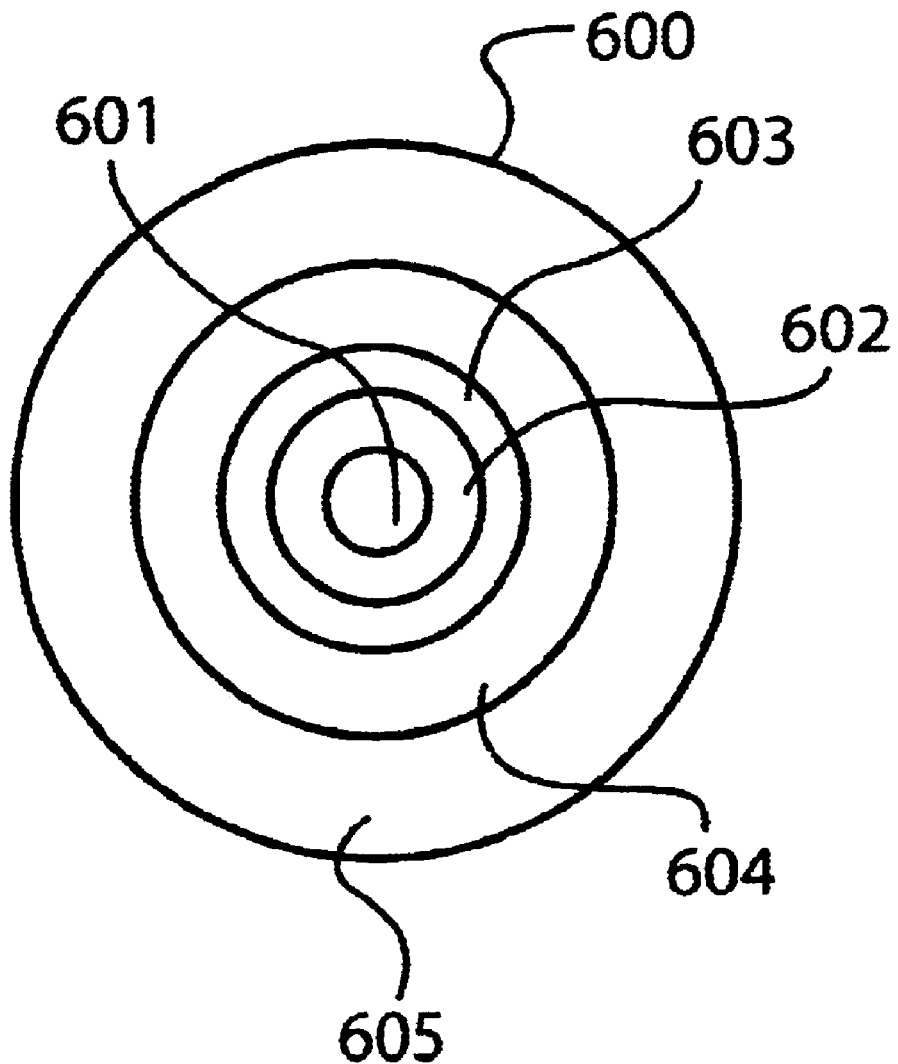
FIGS. 8A–8D are plan views of four alternative embodiments showing multiple detector region patterns.
Figure 8B:
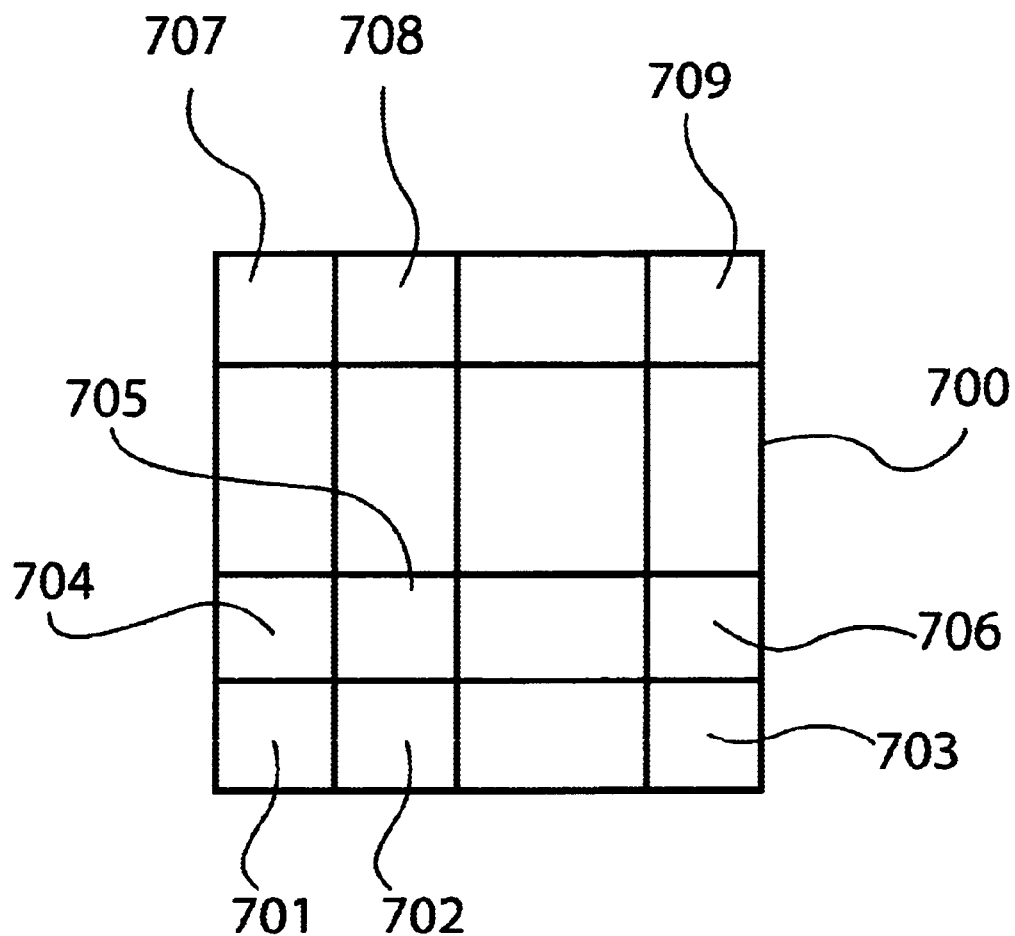
Figure 8C:
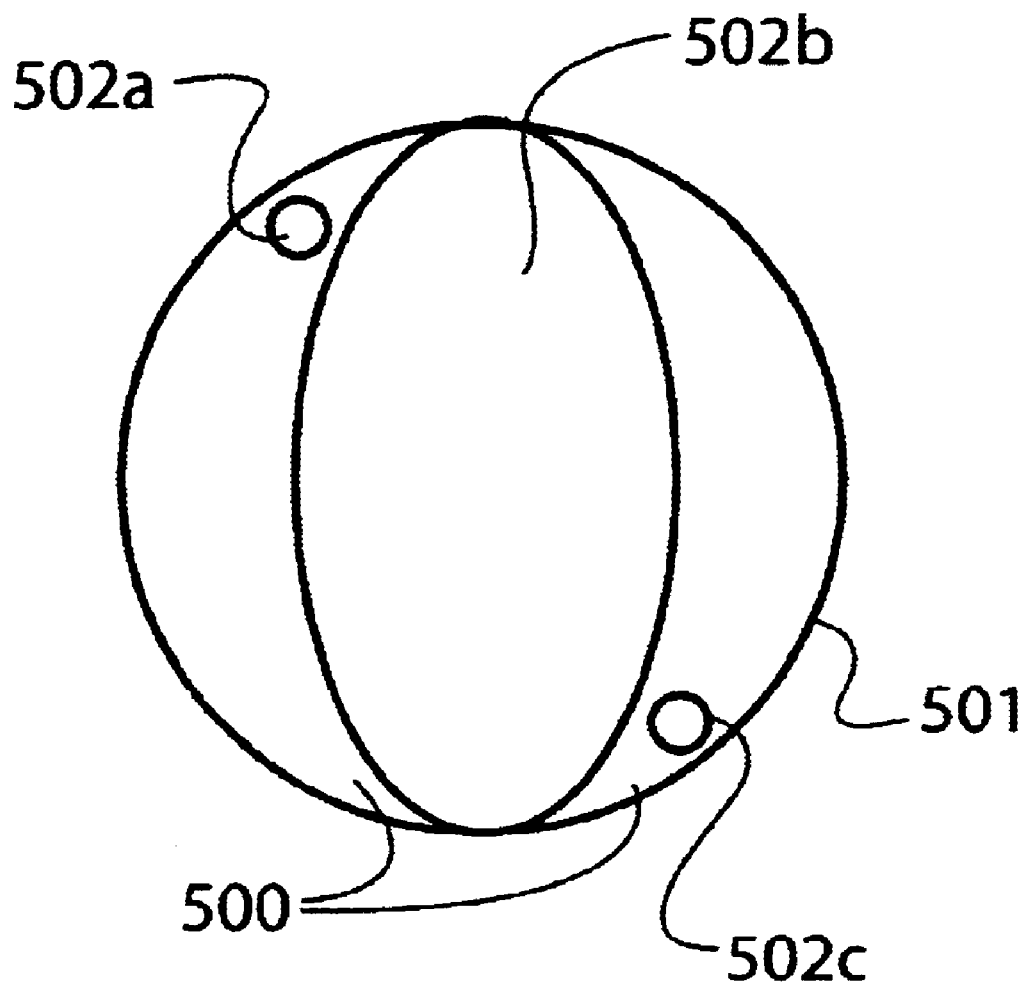
Figure 8D:
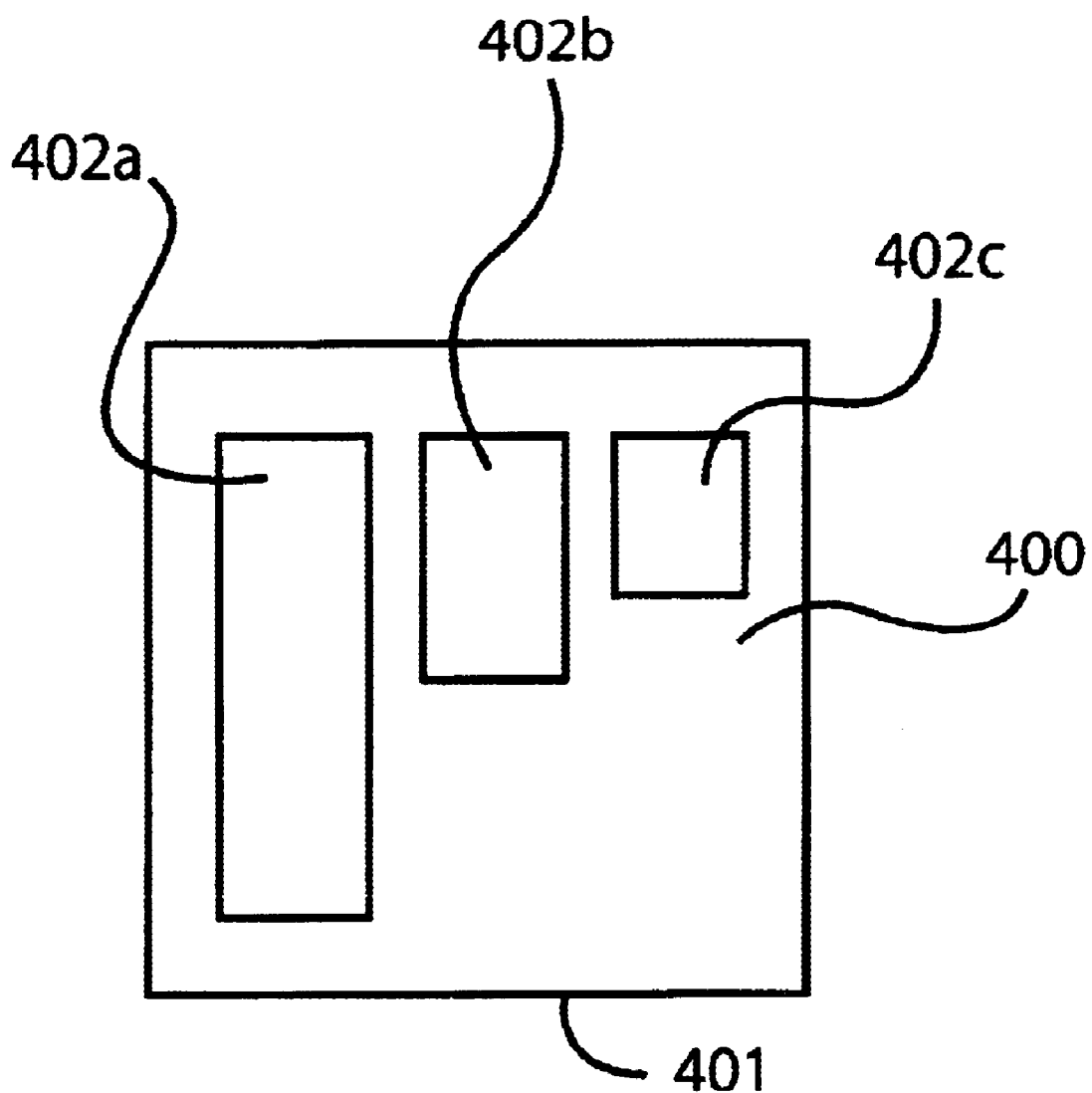

FIGS. 8A–8D are plan views of four alternate embodiments showing domain engineered multiple detector region patterns. As shown in FIG. 8C, electret 501 depicts multiple domain regions 500 and 502a, 502b, 502c to accommodate resonant modes of the electret 501. The direction of the domain region 500 can be either that of the original domain or the reversed domain with the direction of domain region 502 taking the opposite sense of that of domain region 500. Any two adjacent regions are analogous to original domain region 103 and domain reversed region 102 in FIG. 6. As shown in FIG. 8D, electret 401 depicts multiple asymmetrical domain reversed regions 402a, 402b, 402c and original domain region 400. Any two adjacent regions are analogous to original domain region 103 and domain reversed region 102 in FIG. 6. As shown in FIG. 8A, electret 600 depicts annular domain regions 601–605 of concentric rings of alternating domain direction about a central circle. Any two adjacent annular regions are analogous to original domain region 103 and domain reversed region 102 in FIG. 6. The spontaneous polarization of the domain regions starts at the center region and may begin with either the original or domain reversed direction. The number of domain regions can be in the range of 2 to 25000, given an annular width range of approximately 2 μm to 50 mm, the size being dependent upon electret radius. The width of each individual domain region can be but need not be equal.

As shown in FIG. 8B, electret 700 has an array of domain regions 701–709. The regions can be square, rectangular, trapezoidal, triangular, semi-circular, or any other geometric shape. Any of the domain regions 701–709 can have the original domain direction or the reversed domain direction. Each adjacent original domain and reversed domain region, such as domain regions 706 and 703, is analogous to the adjacent domain regions 103 and 102, as shown in FIG. 2. The pattern resulting from such an array of domain regions could be constructed to resemble a checker-board pattern, to produce rows of alternating domains, to produce columns of alternating domains, or to produce a random distribution of original and reversed domain regions. The size and shape of the domain regions can be constructed in a manner to match the spatial distribution of the acoustic resonances and allow nulling of acoustic resonances that are created in the electret crystal. The size of the smallest dimension of any region is in the range of 2 μm to 50 mm, with the upper limit being dependent on electret size. The number of domain regions is generally in the range of 2 to 2,500,000,000 with the upper limit dependent on the domain region size and electret size. Of course, any desired number of domains can be used dependent upon the particular application and the size and shape of the electret.

The domain reversed regions are fabricated as described in FIGS. 1, 2, 3 and 7. For acoustic nulling use, the signal electrode must cover a portion of at least one original domain region and a portion of at least one adjacent domain reversed region such that areas of equal and opposite acoustic sensitivity are created. For position sensing, the signal electrode may cover a region or regions containing a single domain direction, or it may cover a region or regions containing both domain directions. Therefore, the array of regions 701–709 may contain one or more signal electrodes.

Figure 9:
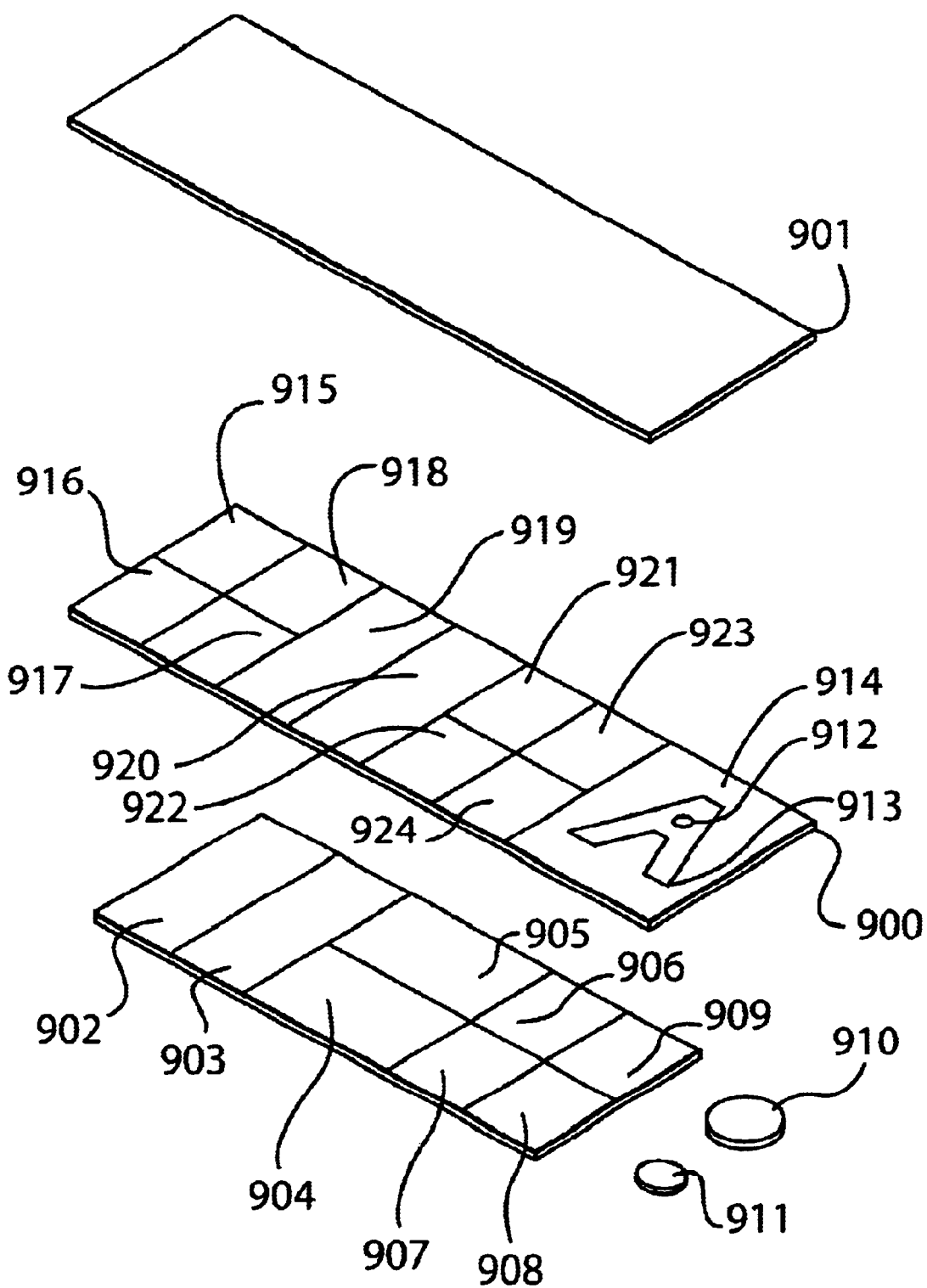
FIG. 9 depicts an alternative embodiment of the invention with multiple regions.

FIG. 9 depicts an alternate embodiment of the invention. Electret 900 has numerous original domain regions 912, 914, 915, 917, 919, 922 and 923 and domain reversed regions 913, 916, 918, 920, 921 and 924. Ground electrode 901 contacts the entire front surface of the electret 900. In a subassembly, electrode 902 spans domain regions 915 and 916. In this configuration, the subassembly can operate as a position sensor with acoustic nulling or simply as an acoustically nulled pyroelectric detector. Other subassemblies comprise electrode 903 and domain regions 917 and 918; electrode 904 and portions of domain regions 919 and 920; electrode 905 and portions of domain regions 919 and 920; electrode 906 and domain region 921; electrode 907 and domain region 922; electrode 908 and domain region 924; electrode 909 and domain region 923. Electrode 910 and 911 may cover parts of domain regions 912, 913 and 914. In the embodiment which does not have a container, each electrode 902 through 911 will also have a signal wire (not shown). Electrode 901 is grounded in this embodiment.

Figure 10:
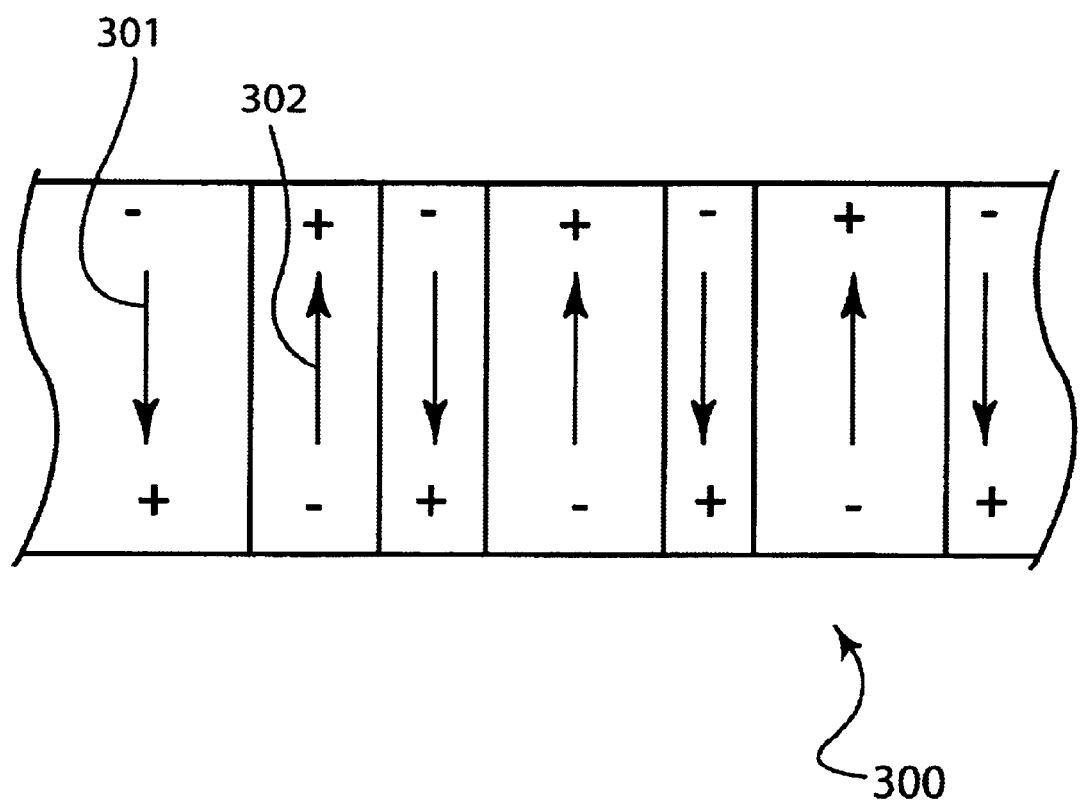
FIG. 10 is a cross-sectional view of a portion of a z-cut electret.

FIG. 10 is a cross-sectional view of a portion of z-cut electret 300. Electret 300 has multiple domains that are polarized in domain direction 301 and domain direction 302. This represents the native arrangement of domains in a piece of ferroelectric material. In most cases, the electrets are supplied having a single domain. A single domain is achieved by applying an electric field along the z direction. This aligns all domains in the electret in the same direction.

Figure 11:
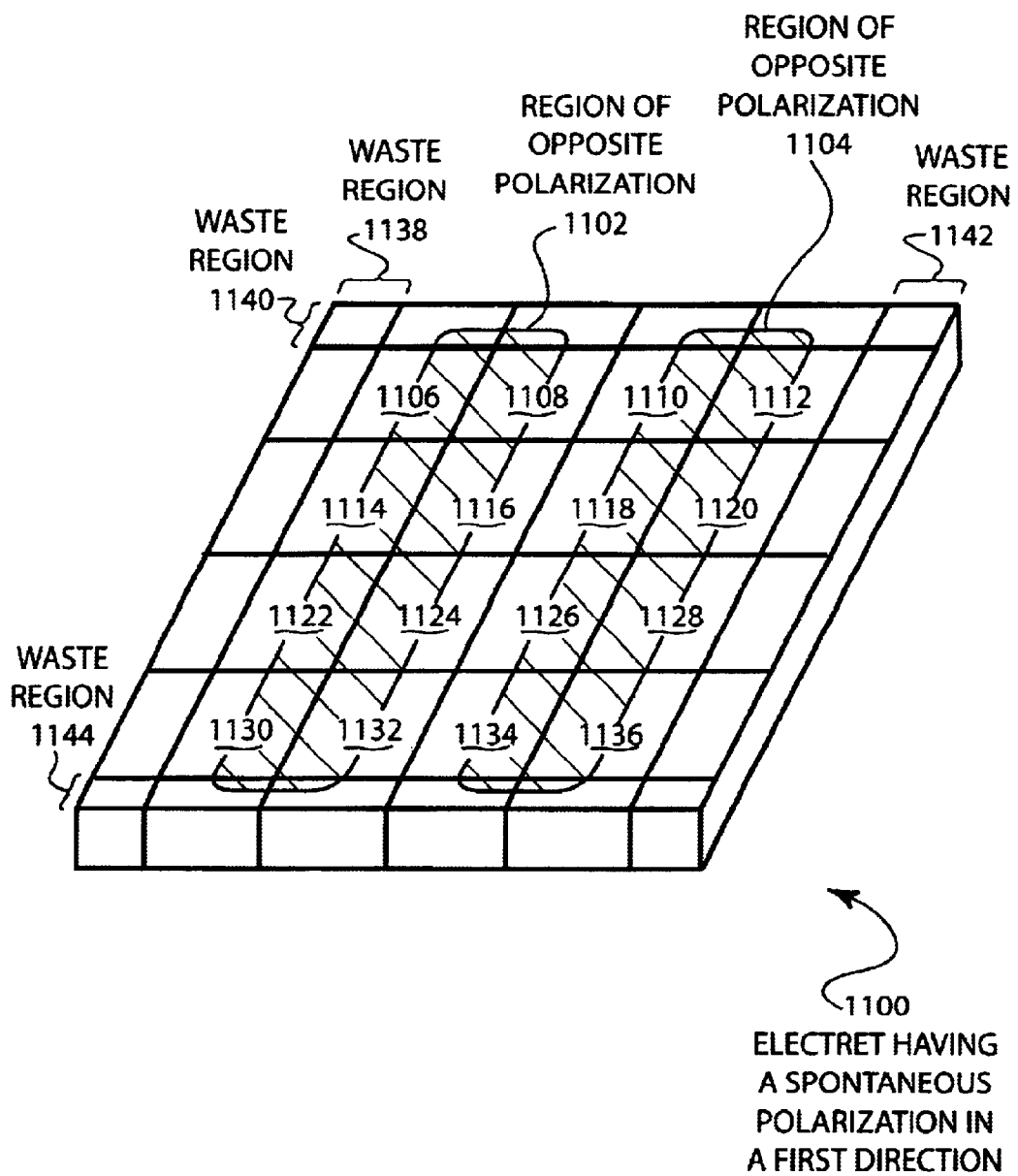
FIG. 11 is an isometric view of an electret for which shadow masks have been used to polarize regions of the electret to produce multiple bicells.

FIG. 11 is an isometric view of an electret that can be divided up to form sixteen different bicells 1106–1136. As shown in FIG. 11, the electret 1100 has a spontaneous or applied polarization in a first direction. The regions 1102 and 1104 are poled to have a polarization in the opposite direction of the spontaneous or applied polarization of the electret 1100. The poling of the regions 1102, 1104 can be performed in any of the desired manners described above. In addition, a shadow mask can be used to define areas of electrode metal on the surface of the electret 1100 in the regions 1102, 1104 for the purpose of polarizing the electret 1100 with the opposite polarization. In operation, a metal shadow mask is made having the shape of the regions 1102 and 1104. The shadow mask is placed on the surface of the electret 1100. Metal is then evaporated or sputtered onto the surface of the electret 1100 in the openings of the shadow mask that correspond to the regions 1102, 1104. These metal deposits are then used as a poling electrode. An electric field is applied to the poling electrodes to polarize the electret in the regions 1102, 1104 in a direction that is opposite to the polarization of the electret 1100. The poling electrode is then removed and a pair of detector electrodes (not shown) can then be applied to the top and bottom surfaces of the electret 1100. The electret 1100 can then be sawn or diced along the lines shown in the electret 1100. The waste regions 1138, 1140, 1142 and 1144 are then discarded. This leaves sixteen separate bicells 1106–1136 that are produced in a simple, inexpensive and rapid manner. Of course, multiple reverse domain regions can be generated using shadow masks depending upon the number of domain regions required and the size of the individual crystals.

FIG. 11, as well as other figures provided herein, are not necessarily to scale. Bicells or multicells that are created in accordance with the present invention may have an aspect ratio of thickness to width and height that is much smaller than that which is shown in FIG. 11. Further, any desired fashion of generating bicells or multicells using a shadow mask can be used. FIG. 11 simply illustrates one way in which a particular number of bicells can be created using a shadow mask.

The bicells illustrated in FIG. 11 can be used for many different purposes. For example, these types of mass produced bicells can be used in motion detectors that detect black body radiation. Motion detectors that are currently available use two individual crystals that are poled in opposite directions so that acoustic noise can be nulled. Single crystal bicells can be used to replace these dual crystal elements and can be mass produced using shadow masking techniques, such as described above. In addition, the cost of manufacturing can be greatly reduced using a single crystal device.

Figure 12:
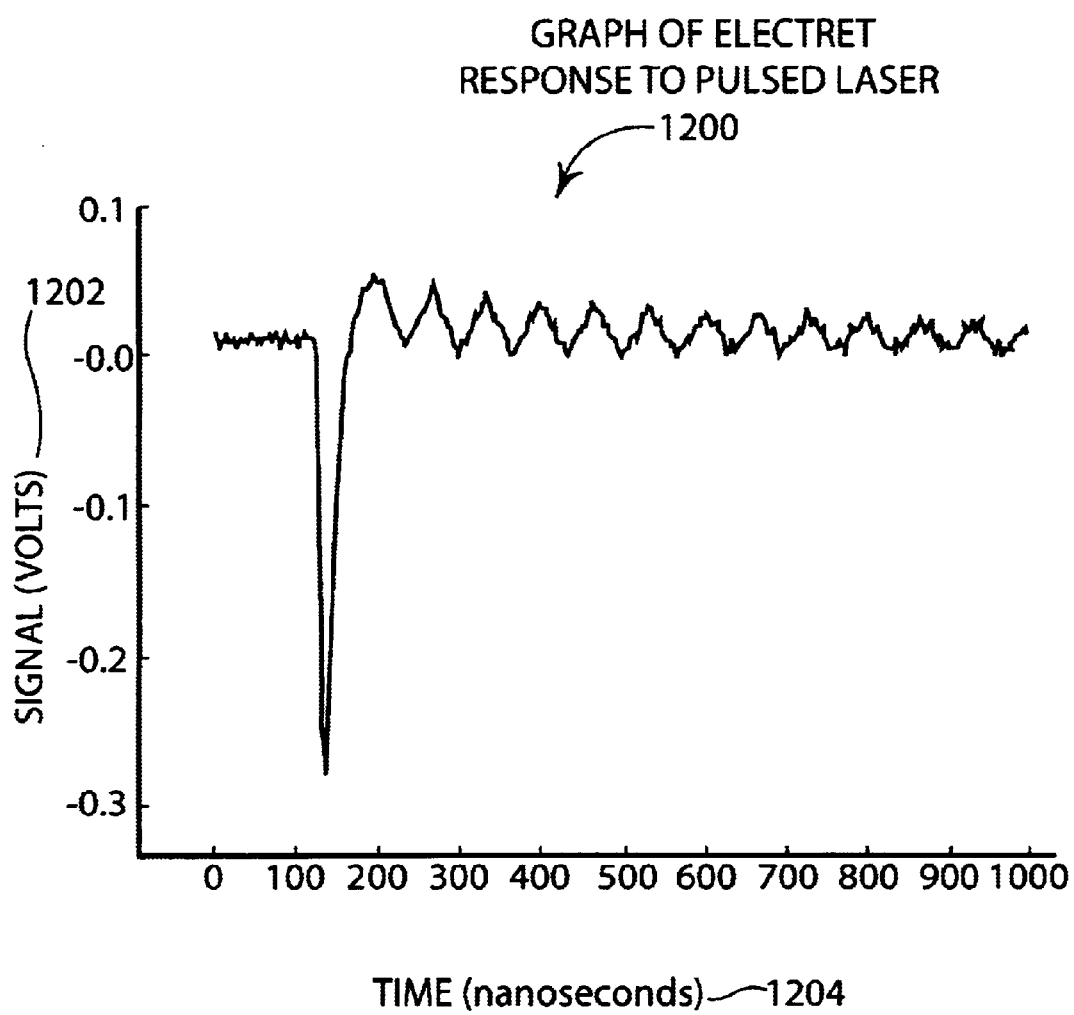
FIG. 12 is a graph of the response of a standard pyroelectric detector to a pulsed

FIG. 12 is a graph 1200 of the electret response to a pulsed laser. The graph illustrates data acquired from the voltage response of a pyroelectric detector that is impinged by a pulsed laser having an output of 193 nm wavelength, 14 ns pulse duration and 20 mega joules per pulse. The periodic variation of the voltage response is the result of acoustic ringing initiated by the radiation pressure of the pulse laser. Acoustic ringing is reported by C. B. Roundy and R. L. Byer, *Subnanosecond Pyroelectric Detector*, Applied Physics Letters, Vol. 21, Number 10, 1972, pp. 512–515. As can be seen from FIG. 12, a standing wave pattern is generated in the electret. The speed of sound in $LiNbO_3$ and $LiTaO_3$ is approximately 6 km per second. The period of the acoustic ringing, as illustrated in FIG. 12, is approximately 100 ns.

Figure 13:
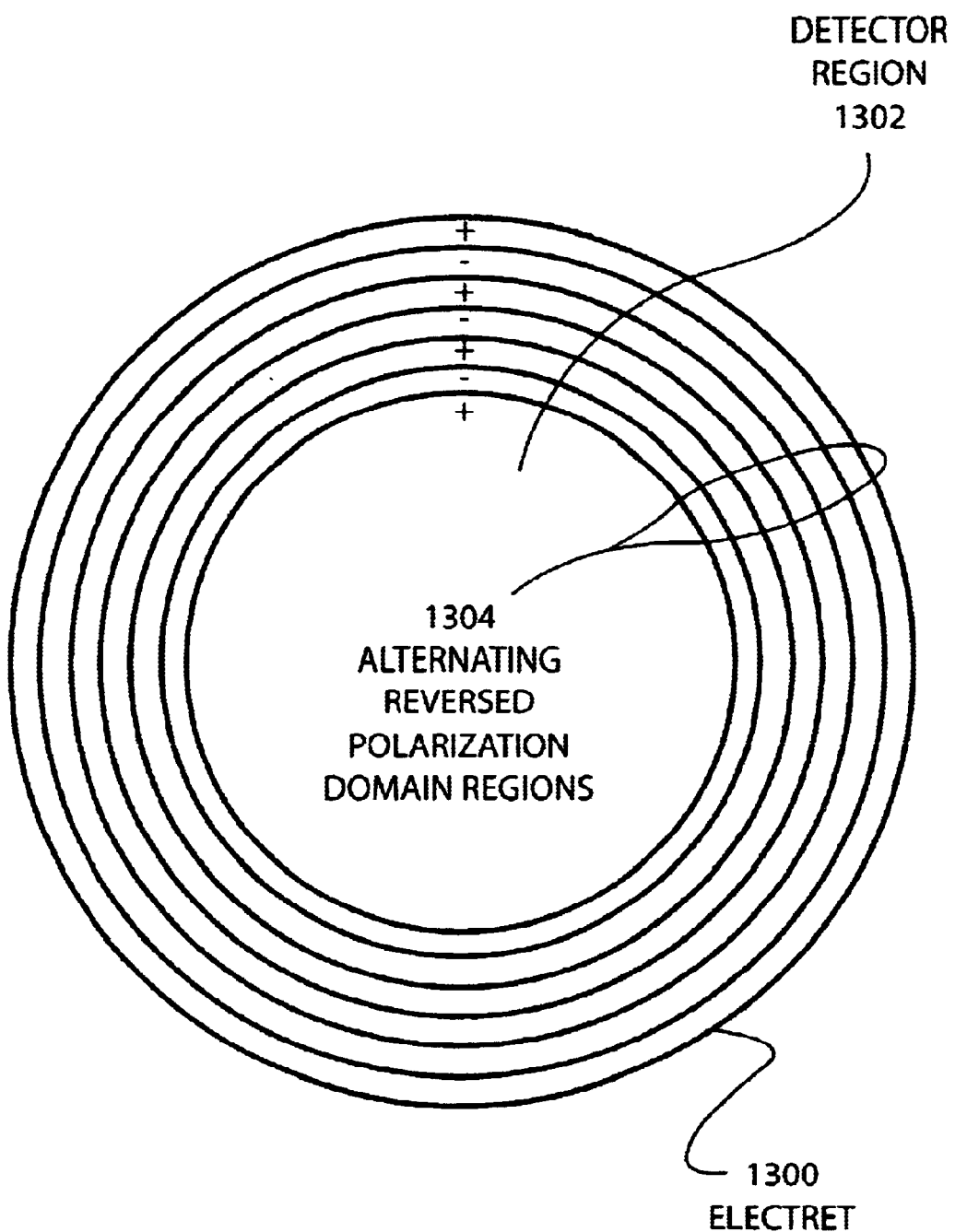
FIG. 13 is a schematic diagram of a detector with an annular pattern of alternating reversed polarization domain regions.

To reduce the standing acoustic waves within an electret such as electret 1300 of FIG. 3, concentric domain regions 1304 can be constructed having alternating reverse polarizations as shown in FIG. 13. The width of each of the domain-reversed regions has been calculated to be on the order of 300 microns. Alternating reversed polarization domain regions 1304 are spaced in an annular pattern around the detector region 1302. By adding the responses of each of the alternating reversed polarization domain regions 1304, nulling techniques can be applied. The width of the alternating reverse polarization domain regions 1304 is approximately equal to the product of the speed of sound in the electret material 1300 multiplied by the period of the ringing, i.e. 100 ns. This is an approximation that appears to be valid for at least some range of frequencies for the standing wave pattern illustrated in FIG. 12. The particular width of the alternating reverse polarization domain regions 1304 of FIG. 13 can be determined empirically to account for flexural modes and thickness variations as a result of pulsing of the pulsed laser and other sources of acoustic noise. The aspect ratio of the crystal, i.e. the thickness versus the surface area of the crystal, can also be adjusted together with the size of the alternating reverse polarization domain regions 1304 to maximize the effect of nulling.

Of course, the acoustic noise interference, which may take the form of a standing or traveling wave pattern, is dependent upon numerous factors. For example, both $LiNbO_3$ and $LiTaO_3$ are anisotropic and the speed of sound varies as a function of the crystal orientation. The length of the period of ringing varies because the resonances vary as a function of the crystal geometry and the acoustic impedance of the detector package and ambient environment. In addition, the shape and configuration of the package holding the crystal can affect the standing wave patterns.

Figure 15:
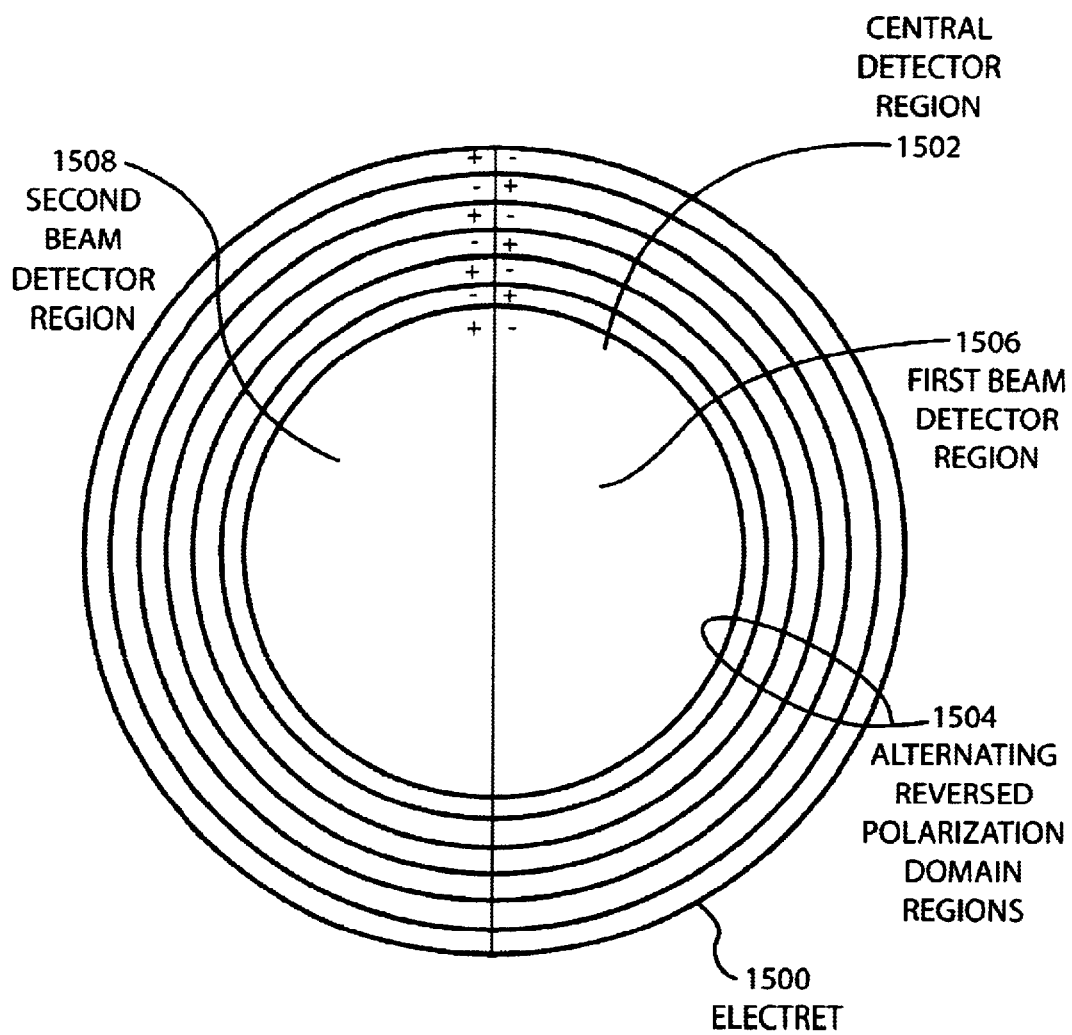
FIG. 15 is a schematic illustration of a beam detection device using a plurality of semi-annular rings that surround a central detector region.
Figure 16:
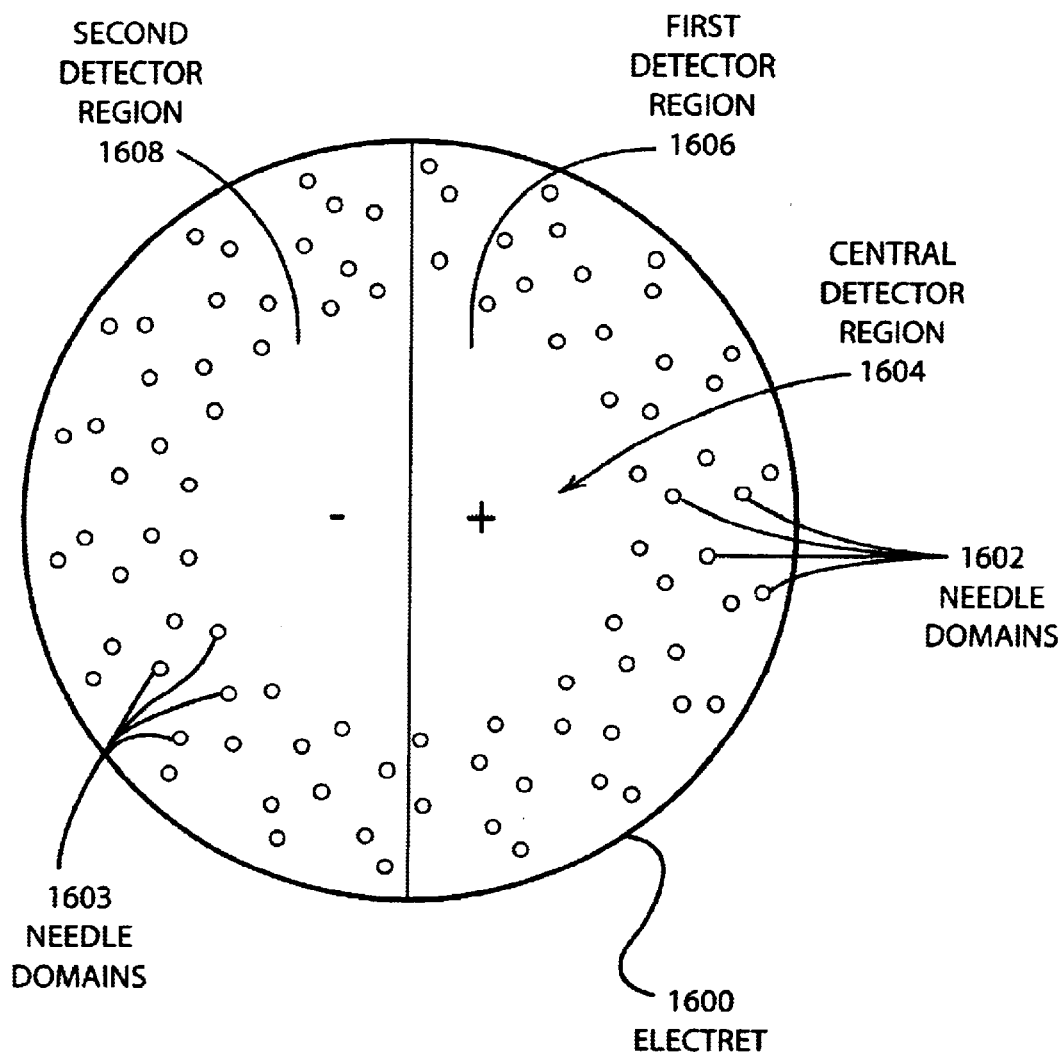
FIG. 16 is a schematic illustration of a beam location detector that has a central detection region and a plurality of needle domains surrounding the central detection region.
Figure 17:
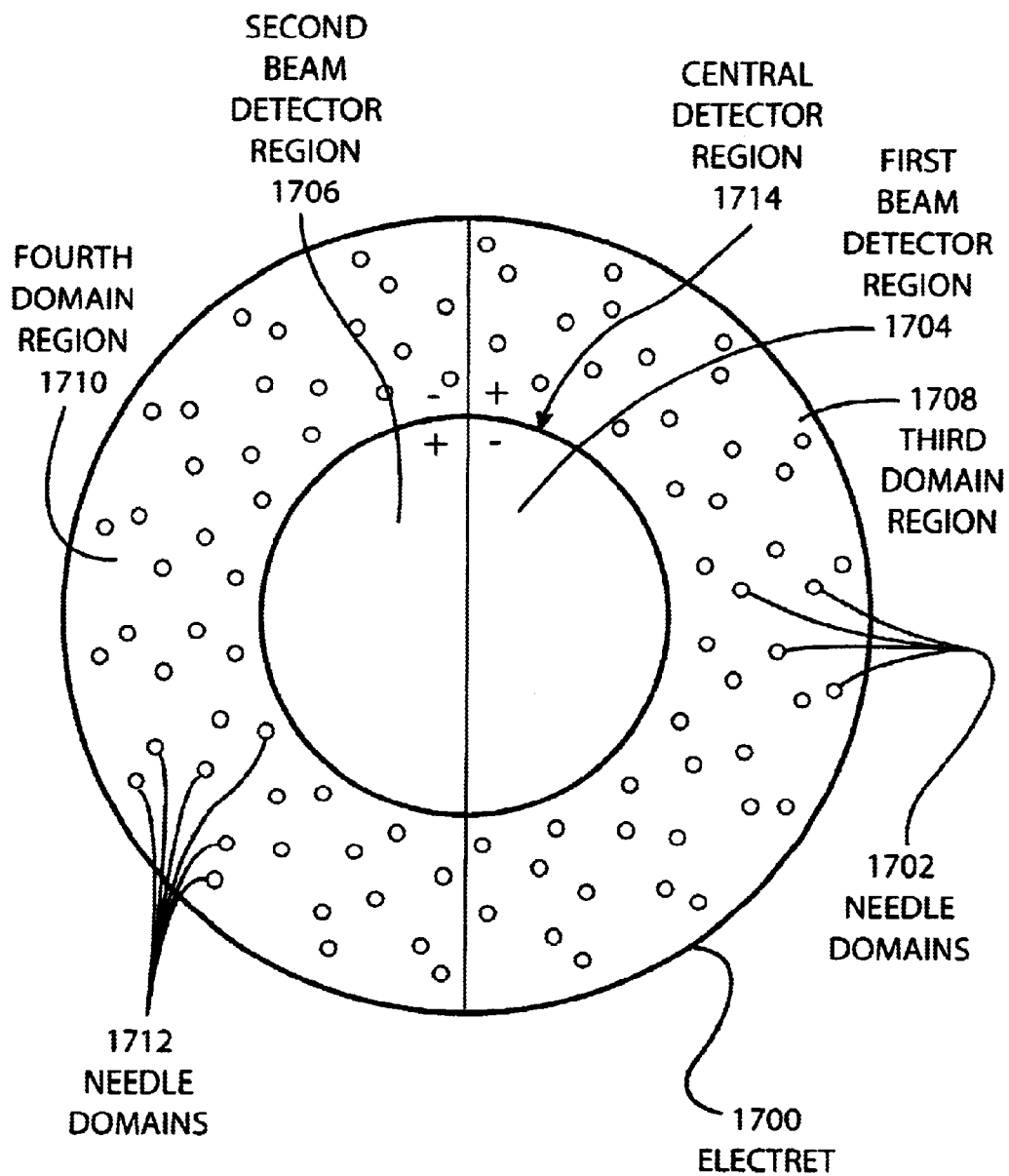
FIG. 17 is a schematic illustration of a detector that has a central bicell detection region and two domain regions surrounding the detector region having needle domains.

The detector electrode (not shown) can be disposed across substantially the entire surface of both the front and back surface of the detector illustrated in FIG. 13. Accumulated charges are then collected on each of these detector electrodes as described above. The same is also true for the devices illustrated in FIGS. 14 through 19. The detector electrodes can be disposed over substantially the entire surface or over just a central detection region in FIGS. 13 through 19 as desired by the user. For example, but not by way of limitation, FIGS. 15, 16 and 17 illustrate the use of a bicell in a central detection region. It may be desirable to place the detector over only the central detection region in each of these embodiments, as desired by the user. Again, the placement of the electrode on each of the embodiments illustrated in FIGS. 13 through 19 may vary according to the particular uses of the detector and the type of response desired by the user. Further, each of the embodiments illustrated in FIGS. 13 through 19 has not necessarily been constructed and tested, as well as other embodiments disclosed above.

In addition to the nulling that can be achieved by using alternating reversed polarization domain regions, such as shown by the concentric rings of electret 1300, the domain boundaries also function to impede the propagation of the acoustic wave. In other words, the domain boundaries disrupt the standing waves and the resonances that are produced by the standing waves. This is the result of the crystal geometry at the interface of the oppositely polarized domain regions. The acoustic ringing can be caused by flexural vibrations as well as thickness vibrations. The domain engineering of the crystal may also function to dampen the piezoelectric effect that can result from both flexural and thickness vibrations. The particular physical attributes that cause the dampening and scattering of the acoustic wave may not be clear, but the beneficial effects the use of the domain regions in a single crystal has been verified.

Figure 14:
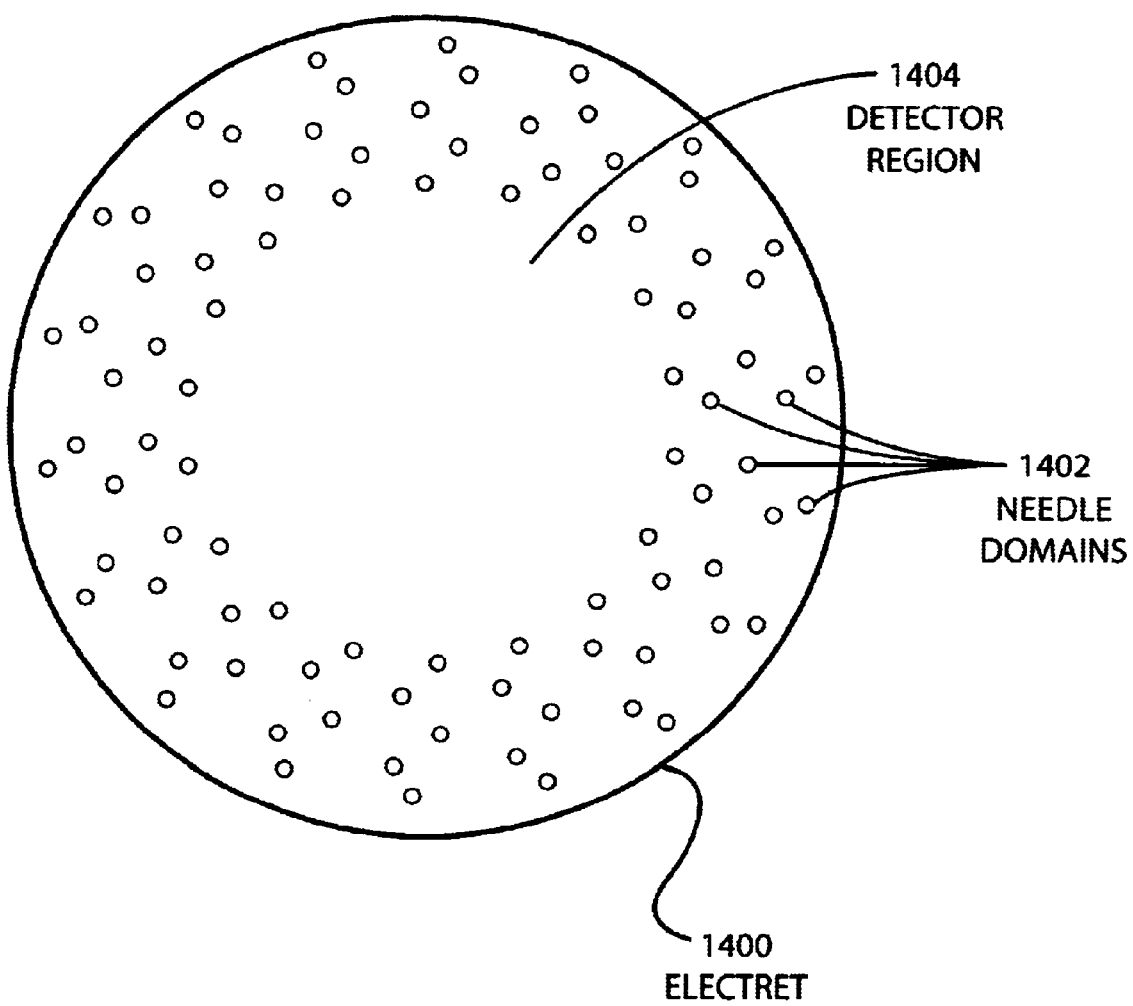
FIG. 14 is a schematic depiction of an electret having a plurality of needle domains dispersed around a central detector region.

FIG. 14 is a depiction of an electret 1400 that has a plurality of needle domains 1402 that surround a detection region 1404. The needle domains 1402 are singular areas scattered throughout the crystal that have a polarization that is opposite of the spontaneous polarization of the crystal 1400. See A. J. DeVries, P. Everett, D. F. Gilchrist, K. Hansen, and T. J. Wajcik, *Acoustic Effects of Filamentary Defects in Y-Z LiNbO$_3$*, 1979 Ultrasonics Symposium, IEEE, 1979, pp. 584–588. These needle domains can be generated spontaneously when the electret crystal 1400 is spontaneously polarized or polarized by application of an electric field. The needle domains 1402 function to scatter the wavefronts of the acoustic wave within the electret crystal 1400. The effect of the acoustic wave is therefore diminished by the needle domains 1402. Since the wavefronts of the acoustic noise are scattered and dissipated, the reflected wave patterns from the edge of the electret 1400 are substantially reduced. In this fashion, the effect of acoustic noise is greatly reduced. If a beam from a pulsed laser is detected, the beam will normally be centered in the detector region 1404. The acoustic noise that is generated by the radiation pressure of the pulsed laser beam generates wavefronts that are then dissipated by the needle domains 1402 while the acoustic wave travels towards the edge of the electret 1400 and after the acoustic wave is reflected from the edge of the holder.

FIG. 15 is a schematic diagram of an electret 1500 that has a central detector region 1502 that is divided into a bicell comprising a first detector region 1506 and a second detector region 1508. The first and second detector regions 1506, 1508 have opposite polarizations. In that fashion, the position (location) of a radiation source focused on the central detector region 1502 can be determined. The detector electrode (not shown) that can be used in conjunction with FIG. 15 may be disposed over the entire area of the electret 1500 including the central detector region 1502 and the alternating reversed polarization domain regions 1504. In this fashion, charges that accumulate on the detector from acoustic noise are automatically cancelled since a substantially equal amount of surface area of the detector electrode is coupled to oppositely polarized domain regions. However, if a radiation source is displaced horizontally from the center of the electret 1500 in the central detector region 1502, the pyroelectric effect of the electret 1500 will cause a greater output from one of the first beam detector region 1506 or the second beam detector region 1508. In other words, if a radiation source such as a pulsed laser is deflected towards the right, the first beam detector region 1506 will produce a greater output than the second beam detector region 1508. Hence, a greater negative value will indicate a displacement of the beam to the right since the first beam detector region 1506 has a negative polarization. Of course, the opposite is true if the beam is deflected to the left.

FIG. 16 is a schematic illustration of an electret 1600 that has a series of needle domains 1602 that surround a central detector region 1604. The electret 1600 is divided into two oppositely polarized regions, i.e. a first detector region 1606 and a second detector region 1608. The needle domains 1602 that are contained within the first detector region 1606 have a negative polarization, i.e. a polarization that is opposite to the positive polarization of the first detector region 1606. The needle domains 1603 that are disposed in the second detector region 1608 have a positive polarization, i.e., a polarization that is opposite to the negative polarization of the second detector region 1608. A detector electrode (not shown) can be disposed over the entire surface of the electret 1600. If the radiation source that is being detected is focused on the central detector region 1604, the detector 1600 illustrated in FIG. 16 can be used as a beam location device in the manner described above. The radiation source can also be defocused or otherwise made to impinge upon the entire surface of the detector 1600 so that the radiation pattern of the radiation source does not affect the response of the detector 1600. In this fashion, the detector 1600 illustrated in FIG. 16 does not necessarily have to operate as a beam location device.

FIG. 17 is a schematic diagram of a electret 1700 that is similar to the electret 1600. As shown in FIG. 17, electret 1700 has a first beam detector region 1704 and a second beam detector region 1706 that are located in a central detector region. First beam detector region 1704 is surrounded by a third domain region 1708 that includes a plurality of needle domains 1702. Similarly, second beam detector region 1706 is surrounded by a fourth domain region 1710 that includes a plurality of needle domains 1712. As shown in FIG. 17, the first beam detector region 1704 has a negative polarization. The third domain region 1708 has a positive, or opposite, polarization to that of the first beam detector region 1704. The needle domains 1702 have a negative polarization which is opposite to the polarization of the third domain region 1608. Similarly, the second beam detector region 1706 has a positive polarization which is opposite of the polarization of the first beam detector region 1704. The fourth domain region 1710 has a negative polarization which is opposite to that of the second beam detector region 1706. Needle domains 1712 have a positive polarization which is opposite to the fourth domain region 1710.

In operation, the device of FIG. 17 can be configured in several different ways. For example, a detector electrode can be disposed just over the central detector region 1714. Acoustic noise will be cancelled because of the substantially equal and opposite polarization regions provided by the first beam detector region 1704 and the second beam detector region 1706. The beam can be focused to fall within the central detector region 1714 and used as a beam location detector. Alternatively, the beam can be defocused or made to impinge upon a larger area so that the beam location is not a factor in detecting the radiation beam. Alternatively, the detector electrode can be placed over the entire surface of the electret 1700. Substantially, equal and opposite surface areas of the electret 1700 are provided so that acoustic noise is substantially nulled. The needle domains 1702, 1712 further function to reduce the effects of noise.

Figure 18:
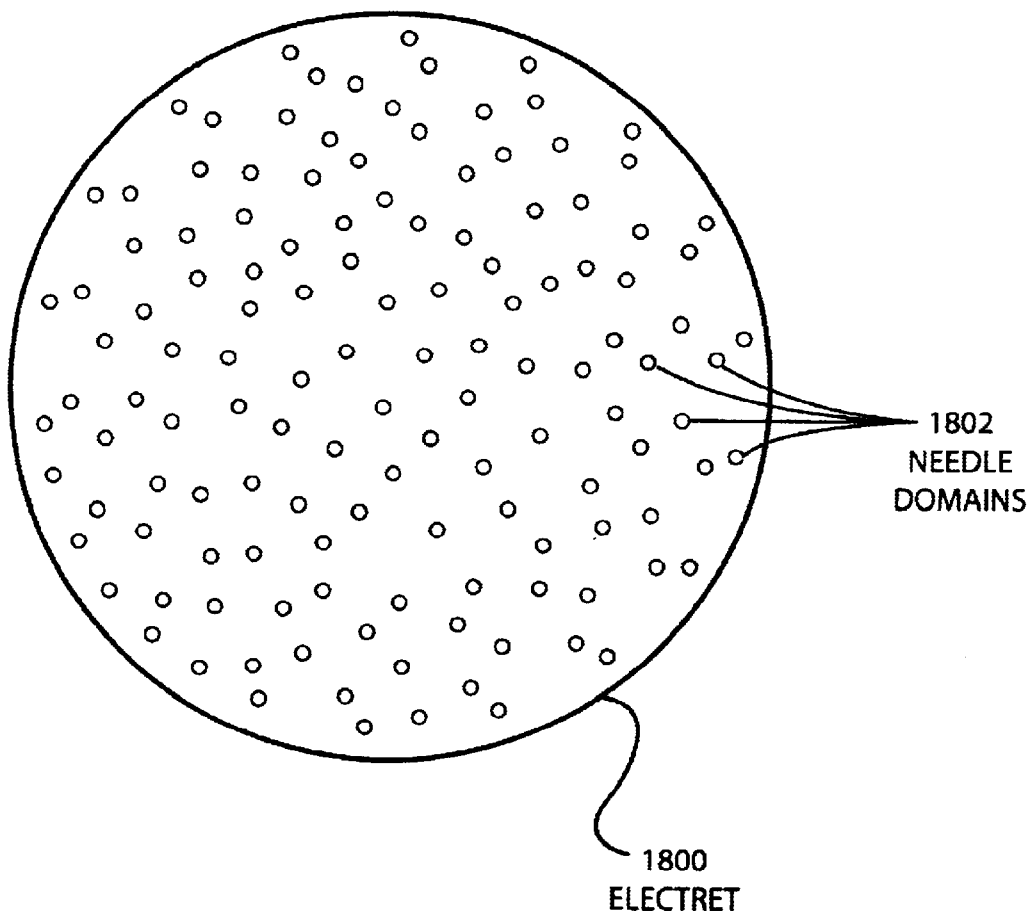
FIG. 18 is a schematic illustration of a detector that includes a plurality of needle domain regions that reduce acoustic noise.

FIG. 18 is a schematic illustration of an electret 1800. The electret 1800 functions as a detector and has a plurality of needle domains 1802 dispersed throughout the electret 1800. As disclosed above, the needle domains 1802 function to disperse and otherwise reduce the effects of acoustic noise in the electret detector 1800.

Figure 19:
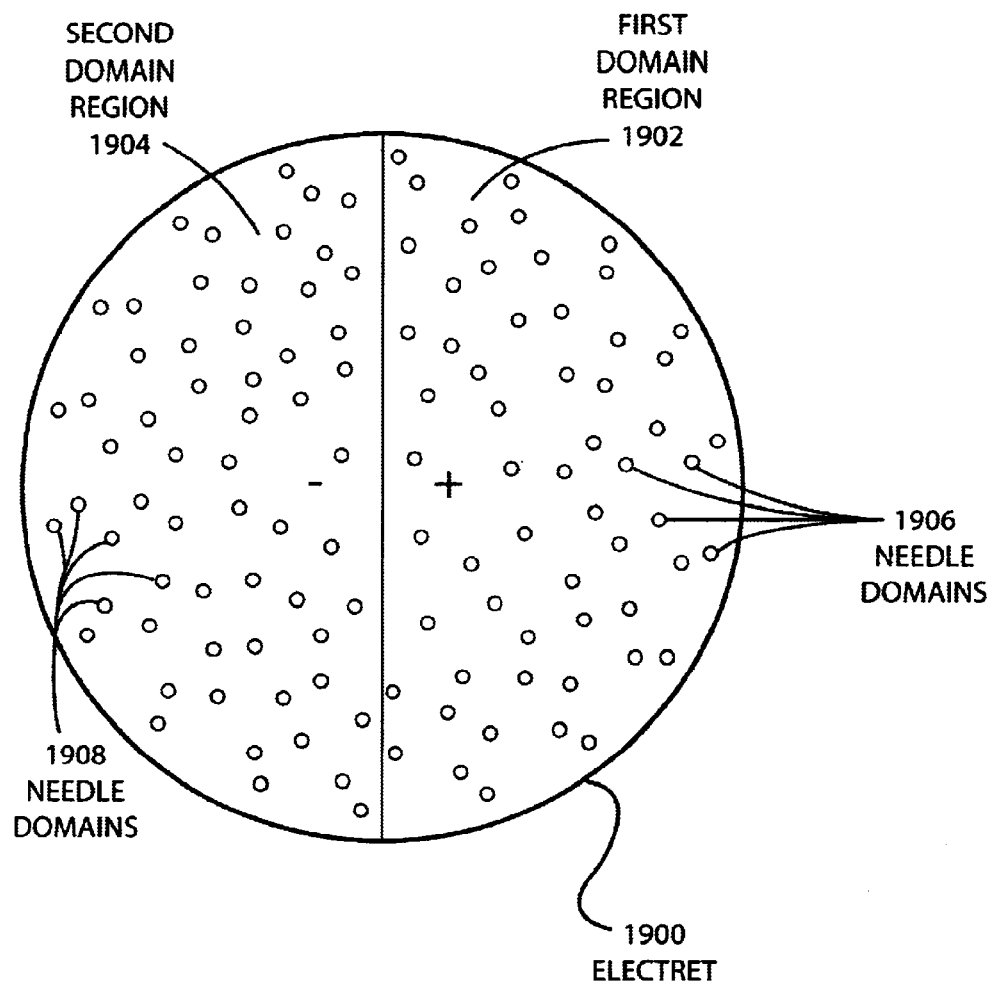
FIG. 19 is a schematic illustration of a detector that has two oppositely poled regions that include needle domain regions disbursed throughout.

FIG. 19 is schematic illustration of an electret 1900 that can function as a beam detector and a beam position locator. The electret 1900 is divided into a first domain region 1902 and a second domain region 1904 having opposite polarities. The first domain region 1902 has a positive polarity, while the second domain region 1904 has a negative polarity. The needle domains 1906 disposed in the first domain region 1902 have a negative polarity which is opposite to the polarity of the first domain region 1902. The needle domains 1908 disposed in the second domain region 1904 have a negative polarity which is opposite to the polarity of the second domain region 1904. In operation, the needle domains 1906, 1908 function to disburse and otherwise reduce the effects of acoustic noise. Since the electret 1900 is divided into a bicell, the horizontal position of the beam can be detected by determining whether the charges detected are more positive or more negative. The detector electrodes (not shown) are disposed on both sides of the electric 1900 and may be disposed across the entire surface of the electret 1900. The detector electrodes should cover equal portions of the first and second domain regions 1902, 1904 to insure that nulling occurs from acoustic noise generated in the electret 1900.

The present invention therefore provides for the use of shadow masks to produce numerous bicells and multiple cell reverse domain region crystals in a simple and inexpensive manner. Further, the use of multiple alternating reverse polarization domain regions on a single crystal has been found to dampen the acoustic waves through physical processes related to the domain region interfaces. Needle domains can also be used to scatter the acoustic waves and thereby reduce the effect of these waves. Proper sizing and shaping of the alternating reversed polarization domain regions allows for the nulling of standing acoustic waves. The size of the alternating domain regions can be determined for various crystals having various aspect ratios, mounting conditions, and other environmental effects using empirical techniques. Further, the size of needle domain regions can be roughly calculated by multiplying the speed of propagation of the acoustic noise through the particular crystal multiplied by the period of the standing wave pattern. Hence, given a particular electret crystal material and the period of the standing wave pattern, the width of the alternating reversed polarization domain regions can be estimated with some degree of accuracy.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of reducing acoustic noise in a pyroelectric detector formed from a z-cut single crystal electret comprising:

generating a plurality of domain regions in said electret having opposite polarization directions, said domain regions having a periodic pattern that substantially corresponds to wave patterns of acoustic noise;

providing an electrode that covers approximately equal portions of said plurality of domain regions, so that charges generated by said plurality of domain regions in response to acoustic noise can be combined to substantially null said acoustic noise.

2. The method of claim 1 wherein said step of generating a plurality of domain regions comprises:

generating a central circular portion in said electret;

generating a plurality of annular rings around said central circular portion that have alternating reversed polarizations, said annular rings having a width that is an integer value of the wavelength in said electret of at least one source of acoustic noise.

3. The method of claim 2 wherein said step of generating a plurality of annular rings comprises:

generating a plurality of annular rings that are an integer fractional value of said wavelength.

4. The method of claim 2 wherein said step of generating a plurality of annular rings comprises:

generating a plurality of annular rings that are an integer multiple value of said wavelength.

5. The method of claim 1 wherein said step of generating a plurality of domain regions comprises:

generating a plurality of nonuniformly spaced rings having a size that corresponds to standing wave patterns produced in said electret by the interference of reflected acoustic waves and acoustic waves from input noise.

6. The method of claim 1 wherein said step of generating a plurality of domain regions comprises:

generating a central portion that is non-circular.

7. A method of constructing a pyroelectric detector from a z-cut single crystal electret comprising:

generating a first domain region in said electret having a first polarization;

generating a plurality of needle domain regions having a polarization which is opposite to the first predetermined polarization.

8. The method of claim 4 wherein said step of generating a plurality of needle domain regions comprises:

generating a plurality of needle domain regions in an area on said electret that is outside of a central detector region of said electret.

9. The method of claim 4 wherein said step of generating a plurality of needle domain regions comprises:

generating a plurality of needle domain regions that are spread throughout said electret.

10. The method of constructing a multicell pyroelectric detector formed from a z-cut single crystal electret for detecting the position of a light beam comprising:

generating a first set of at least two domain regions in a central portion of said electret having opposite polarizations;

generating a second set of a plurality of domain regions surrounding said central portion of said electret, said second set of said plurality of domain regions having a periodic pattern that substantially corresponds to wave patterns of acoustic noise;

providing an electrode that covers approximately equal portions of said first and second sets of domain regions so that charges generated by said first and second sets of domain regions in response to said acoustic noise are combined to substantially null said acoustic noise, said electrode also providing a charge indicating the amount of displacement of said light beam in said central portion.

11. The method of claim 10 wherein said step of generating a second set of a plurality of domain regions comprises:

generating a central circular portion in said electret that is divided into at least two substantially equal detector regions;

generating a plurality of semi-annular rings around said central circular portion that have alternating reversed polarizations, said semi-annular rings having a width that is an integer value of the wavelength in said electret of at least one source of acoustic noise.

12. The method of claim 10 wherein said step of generating a second set of a plurality of domain regions comprises:

generating a plurality of annular rings around said central circular portion that have alternating reversed polarizations, said annular rings having a width that is an integer fractional value of said wavelength in said electret of at least one source of acoustic noise.

13. The method of claim 11 where said step of generating a plurality of semi-annular rings comprises:

generating a plurality of semi-annular rings that are an integer multiple value of said wavelength.

14. The method of constructing a multicell pyroelectric detector formed from a z-cut single crystal electret for detecting the position of a light beam comprising:

generating at least two domain regions in a central portion of said electret having opposite polarizations;

generating a plurality of needle domain regions surrounding said central portion of said electret.

15. The method of forming a plurality of pyroelectric detectors formed using a shadow mask comprising:

providing a z-cut single crystal electret having a spontaneous polarization in a first direction;

placing a shadow mask on the electret that has openings that correspond to the regions in which a polarization is desired that is opposite to the spontaneous polarization of the electret;

depositing a poling electrode on said electret in the areas of the openings of the shadow mask;

using said poling electrodes to polarize the electret with said opposite polarization;

removing said poling electrodes;

dividing up said electret to form said plurality of pyroelectric detectors.

16. The method of claim 9 wherein said step of dividing said electret comprises:

dividing said electret to form a plurality of bicell pyroelectric detectors.

17. A bicell pyroelectric detector formed by the process of:

providing a z-cut single crystal electret having a spontaneous polarization in a first direction;

placing a shadow mask on the electret that has openings that correspond to the regions in which a polarization is desired that is opposite to the spontaneous polarization of the electret;

depositing a poling electrode on said electret in the areas of the openings of the shadow mask;

using the poling electrodes to polarize the electret with said opposite polarization;

removing said poling electrodes;

dividing up said electret to form said plurality of bicell pyroelectric detectors.

18. A multicell pyroelectric detector formed by the method of:

providing a z-cut single crystal electret having a spontaneous polarization in a first direction;

placing a shadow mask on the electret that has openings that correspond to the regions in which a polarization is desired that is opposite to the spontaneous polarization of the electret;

depositing a poling electrode on said electret in the areas of the openings of the shadow mask;

using said poling electrodes to polarize the electret with said opposite polarization;

removing said poling electrodes;

dividing up said electret to form said plurality of multicell pyroelectric detectors.

19. A pyroelectric detector formed from a z-cut single crystal electret comprising:

a central portion of said electret;

a plurality of domain regions surrounding said central portion said plurality of domain regions having opposite polarization directions, said plurality of domain regions having a periodic pattern that substantially corresponds to wave patterns of acoustic noise generated in said electret;

an electrode that covers approximately equal portions of said plurality of domain regions so that charges generated by said plurality of domain regions in response to acoustic noise are combined to substantially null said acoustic noise.

20. A pyroelectric detector comprising:

a z-cut single crystal electret having a spontaneous polarization in a first direction;

a plurality of needle domains dispersed throughout said electret that reduce the effect of acoustic noise.

21. A pyroelectric detector that reduces acoustic noise comprising:

a z-cut single crystal electret having a polarization in a first direction;

at least one detector region disposed on said electret;

a plurality of needle domain regions having a polarization that is opposite to said first direction, said needle domain regions dispersed in said electret around at least one detector region of said electret.

22. The pyroelectric detector of claim 15 further comprising:
   a detector electrode disposed on at least said detector region.

23. A multicell pyroelectric detector formed from a z-cut single crystal electret that is capable of detecting the position of a light beam comprising:
   at least two domain regions located in a central portion of said electret having opposite polarizations;
   a plurality of domain regions surrounding said central portion of said electret, said plurality of domain regions having a periodic pattern that substantially corresponds to wave patterns of at least one source of acoustic noise;
   an electrode that covers approximately equal portions of said central portion and said plurality of domain regions so that charges generated by said at least two domain regions and said plurality of domain regions in response to said acoustic noise are combined to substantially null said acoustic noise, said electrode also providing a charge from said at least two domain regions indicating the amount of displacement of said light beam in said central region.

24. A multicell pyroelectric detector formed from a z-cut single crystal electret that is capable of detecting the position of a light beam comprising:
   a first set of at least two domain regions in a central portion of said electret having opposite polarizations;
   a second set of at least two domain regions having opposite polarizations that surrounds said central portion of said electret;
   a plurality of needle domain regions disposed throughout said second set of said at least two domain regions surrounding said central portion of said electret, said needle domain regions reducing said acoustic noise.

25. The multicell pyroelectric detector of claim 18 further comprising:
   a detector electrode deposited over said central portion.

* * * * *